(12) United States Patent
Guenette et al.

(10) Patent No.: US 9,342,082 B2
(45) Date of Patent: May 17, 2016

(54) METHODS FOR ENCOURAGING ENERGY-EFFICIENT BEHAVIORS BASED ON A NETWORK CONNECTED THERMOSTAT-CENTRIC ENERGY EFFICIENCY PLATFORM

(75) Inventors: Isabel Guenette, Palo Alto, CA (US); Yoky Matsuoka, Palo Alto, CA (US); Anthony Michael Fadell, Portola Valley, CA (US); Matthew Lee Rogers, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 83 days.

(21) Appl. No.: 13/976,400

(22) PCT Filed: Jan. 3, 2012

(86) PCT No.: PCT/US2012/020026
§ 371 (c)(1),
(2), (4) Date: Nov. 8, 2013

(87) PCT Pub. No.: WO2012/092625
PCT Pub. Date: Jul. 5, 2012

(65) Prior Publication Data
US 2014/0058806 A1    Feb. 27, 2014

Related U.S. Application Data

(63) Continuation-in-part of application No. 13/317,423, filed on Oct. 17, 2011.

(60) Provisional application No. 61/429,093, filed on Dec. 31, 2010.

(51) Int. Cl.
*G06Q 30/00* (2012.01)
*G05B 15/02* (2006.01)
(Continued)

(52) U.S. Cl.
CPC ............ *G05D 23/1917* (2013.01); *G05B 15/02* (2013.01); *G05D 23/1902* (2013.01);
(Continued)

(58) Field of Classification Search
CPC .................................................. G06Q 30/0208
USPC ........................................................ 705/14.11
See application file for complete search history.

(56) References Cited

U.S. PATENT DOCUMENTS

| | | | |
|---|---|---|---|
| 3,991,357 A | 11/1976 | Kaminski | |
| 4,183,290 A | 1/1980 | Kucharczyk | |

(Continued)

FOREIGN PATENT DOCUMENTS

| | | | |
|---|---|---|---|
| CA | 2202008 | 2/2000 | |
| EP | 196069 | 12/1991 | |

(Continued)

OTHER PUBLICATIONS

Aprilaire Electronic Thermostats Model 8355 User's Manual, Research Products Corporation, Dec. 2000, 16 pages.
(Continued)

*Primary Examiner* — Amanda Abrahamson
*Assistant Examiner* — Scott C Anderson
(74) *Attorney, Agent, or Firm* — Kilpatrick Townsend & Stockton LLP

(57) ABSTRACT

A home energy efficiency platform is described having as its fundamental component a network-connected, multi-sensing learning thermostat that leverages a visually pleasing interactive display associated therewith to encourage energy-saving behavior by a competitive gamesmanship modality, either in terms of self-competition in which a users energy-saving performance is measured against themselves over time, or in terms of community competition in which a users energy-saving behavior is measured against a relevant community.

7 Claims, 13 Drawing Sheets

(51) Int. Cl.

| | |
|---|---|
| *G05D 23/19* | (2006.01) |
| *G06Q 10/00* | (2012.01) |
| *G06Q 30/02* | (2012.01) |
| *G06Q 30/06* | (2012.01) |
| *G06Q 50/06* | (2012.01) |
| *G06Q 50/16* | (2012.01) |
| *G06Q 20/08* | (2012.01) |
| *F24F 11/00* | (2006.01) |

(52) U.S. Cl.
CPC ............. *G06Q10/20* (2013.01); *G06Q 20/085* (2013.01); *G06Q 30/0207* (2013.01); *G06Q 30/0283* (2013.01); *G06Q 30/06* (2013.01); *G06Q 50/06* (2013.01); *G06Q 50/16* (2013.01); *F24F 2011/0071* (2013.01)

(56) References Cited

U.S. PATENT DOCUMENTS

| | | |
|---|---|---|
| 4,223,831 A | 9/1980 | Szarka |
| 4,335,847 A | 6/1982 | Levine |
| 4,408,711 A | 10/1983 | Levine |
| 4,615,380 A | 10/1986 | Beckey |
| 4,674,027 A | 6/1987 | Beckey |
| 4,685,614 A | 8/1987 | Levine |
| 4,751,961 A | 6/1988 | Levine et al. |
| 4,897,798 A | 1/1990 | Cler |
| 4,971,136 A | 11/1990 | Mathur et al. |
| 5,088,645 A | 2/1992 | Bell |
| 5,211,332 A | 5/1993 | Adams |
| 5,240,178 A | 8/1993 | Dewolf et al. |
| 5,244,146 A | 9/1993 | Jefferson et al. |
| 5,395,042 A | 3/1995 | Riley et al. |
| 5,476,221 A | 12/1995 | Seymour |
| 5,499,196 A | 3/1996 | Pacheco |
| 5,544,036 A | 8/1996 | Brown, Jr. et al. |
| 5,555,927 A | 9/1996 | Shah |
| 5,611,484 A | 3/1997 | Uhrich |
| 5,808,294 A | 9/1998 | Neumann |
| 5,902,183 A | 5/1999 | D'Souza |
| 5,909,378 A | 6/1999 | De Milleville |
| 5,918,474 A | 7/1999 | Khanpara et al. |
| 5,977,964 A | 11/1999 | Williams et al. |
| 6,062,482 A | 5/2000 | Gauthier et al. |
| 6,066,843 A | 5/2000 | Scheremeta |
| 6,072,784 A | 6/2000 | Agrawal et al. |
| 6,095,427 A | 8/2000 | Hoium et al. |
| 6,098,893 A | 8/2000 | Berglund et al. |
| 6,216,956 B1 | 4/2001 | Ehlers et al. |
| 6,349,883 B1 | 2/2002 | Simmons et al. |
| 6,356,204 B1 | 3/2002 | Guindi et al. |
| 6,370,894 B1 | 4/2002 | Thompson et al. |
| 6,415,205 B1 | 7/2002 | Myron et al. |
| 6,478,233 B1 | 11/2002 | Shah |
| 6,622,925 B2 | 9/2003 | Carner et al. |
| 6,645,066 B2 | 11/2003 | Gutta et al. |
| 6,769,482 B2 | 8/2004 | Wagner et al. |
| 6,868,293 B1* | 3/2005 | Schurr et al. ............... 700/22 |
| 6,990,821 B2 | 1/2006 | Singh et al. |
| 7,024,336 B2 | 4/2006 | Salsbury et al. |
| 7,149,727 B1 | 12/2006 | Nicholls et al. |
| 7,149,729 B2 | 12/2006 | Kaasten et al. |
| 7,188,482 B2 | 3/2007 | Sadegh et al. |
| 7,379,791 B2 | 5/2008 | Tamarkin et al. |
| RE40,437 E | 7/2008 | Rosen |
| 7,469,550 B2 | 12/2008 | Chapman, Jr. et al. |
| 7,537,171 B2 | 5/2009 | Mueller et al. |
| 7,644,869 B2 | 1/2010 | Hoglund et al. |
| 7,702,424 B2 | 4/2010 | Cannon et al. |
| 7,784,704 B2 | 8/2010 | Harter |
| 7,802,618 B2 | 9/2010 | Simon et al. |
| 7,848,900 B2 | 12/2010 | Steinberg et al. |
| 7,849,698 B2 | 12/2010 | Harrod et al. |
| 7,854,389 B2 | 12/2010 | Ahmed |
| 8,010,237 B2 | 8/2011 | Cheung et al. |
| 8,019,567 B2 | 9/2011 | Steinberg et al. |
| 8,037,022 B2 | 10/2011 | Rahman et al. |
| 8,090,477 B1 | 1/2012 | Steinberg |
| 8,091,375 B2 | 1/2012 | Crawford |
| 8,131,497 B2 | 3/2012 | Steinberg et al. |
| 8,174,381 B2 | 5/2012 | Imes et al. |
| 8,180,492 B2 | 5/2012 | Steinberg |
| 8,219,249 B2 | 7/2012 | Harrod et al. |
| 2002/0178047 A1* | 11/2002 | Or ........................ G06Q 10/04 705/412 |
| 2004/0249479 A1 | 12/2004 | Shorrock |
| 2005/0090915 A1 | 4/2005 | Geiwitz |
| 2005/0128067 A1 | 6/2005 | Zakrewski |
| 2005/0150968 A1 | 7/2005 | Shearer |
| 2005/0189429 A1 | 9/2005 | Breeden |
| 2005/0192915 A1 | 9/2005 | Ahmed et al. |
| 2005/0195757 A1 | 9/2005 | Kidder et al. |
| 2005/0280421 A1 | 12/2005 | Yomoda et al. |
| 2006/0143236 A1* | 6/2006 | Wu .............................. 707/104.1 |
| 2006/0186214 A1 | 8/2006 | Simon et al. |
| 2006/0196953 A1 | 9/2006 | Simon et al. |
| 2007/0045431 A1 | 3/2007 | Chapman, Jr. et al. |
| 2007/0115902 A1 | 5/2007 | Shamoon et al. |
| 2007/0205297 A1 | 9/2007 | Finkam et al. |
| 2008/0015742 A1 | 1/2008 | Kulyk et al. |
| 2008/0054084 A1 | 3/2008 | Olson |
| 2008/0183335 A1 | 7/2008 | Poth et al. |
| 2008/0191045 A1 | 8/2008 | Harter |
| 2008/0273754 A1 | 11/2008 | Hick et al. |
| 2008/0317292 A1 | 12/2008 | Baker et al. |
| 2009/0001181 A1 | 1/2009 | Siddaramanna et al. |
| 2009/0171862 A1 | 7/2009 | Harrod et al. |
| 2009/0195349 A1 | 8/2009 | Frader-Thompson et al. |
| 2009/0254225 A1 | 10/2009 | Boucher et al. |
| 2009/0259713 A1 | 10/2009 | Blumrich et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0050004 A1 | 2/2010 | Hamilton et al. |
| 2010/0070084 A1 | 3/2010 | Steinberg et al. |
| 2010/0070086 A1 | 3/2010 | Harrod et al. |
| 2010/0070101 A1* | 3/2010 | Benes ................. H04L 12/2818 700/296 |
| 2010/0070234 A1 | 3/2010 | Steinberg et al. |
| 2010/0076835 A1 | 3/2010 | Silverman |
| 2010/0084482 A1 | 4/2010 | Kennedy et al. |
| 2010/0106305 A1 | 4/2010 | Pavlak et al. |
| 2010/0106322 A1 | 4/2010 | Grohman |
| 2010/0167783 A1 | 7/2010 | Alameh et al. |
| 2010/0179704 A1 | 7/2010 | Ozog |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2010/0324962 A1* | 12/2010 | Nesler ................... G05B 15/02 705/7.36 |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0077758 A1 | 3/2011 | Tran et al. |
| 2011/0077896 A1 | 3/2011 | Steinberg et al. |
| 2011/0151837 A1 | 6/2011 | Winbush |
| 2011/0160913 A1 | 6/2011 | Parker et al. |
| 2011/0185895 A1 | 8/2011 | Freen |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0065935 A1 | 3/2012 | Steinberg et al. |
| 2012/0085831 A1 | 4/2012 | Kopp |
| 2012/0101637 A1 | 4/2012 | Imes et al. |
| 2012/0158350 A1 | 6/2012 | Steinberg et al. |

(56) References Cited

U.S. PATENT DOCUMENTS

2012/0221151 A1    8/2012   Steinberg
2012/0252430 A1   10/2012   Imes et al.

FOREIGN PATENT DOCUMENTS

| | | |
|---|---|---|
| JP | 59106311 | 6/1984 |
| JP | 01252850 | 10/1989 |
| WO | 2012061437 A1 | 5/2012 |
| WO | 2012092625 A2 | 7/2012 |
| WO | 2013058820 A1 | 4/2013 |

OTHER PUBLICATIONS

Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, Lux Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp, May 31, 2012, 20 pages.
T8611G Chronotherm IV Deluxe Programmable Heat Pump Thermostat Product Data, Honeywell International Inc., Oct. 1997, 24 pages.
TB-PAC, TB-PHP, Base Series Programmable Thermostats, Carrier Corp, May 14, 2012, 8 pages.
The Perfect Climate Comfort Center PC8900A W8900A-C Product Data Sheet, Honeywell International Inc, Apr. 2001, 44 pages.
TP-PAC, TP-PHP, TP-NAC, TP-NHP Performance Series AC/HP Thermostat Installation Instructions, Carrier Corp, Sep. 2007, 56 pages.
Trane Communicating Thermostats for Fan Coil, Trane, May 2011, 32 pages.
Trane Communicating Thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers, Apr. 15, 2010, 8 pages.
White Rodgers (Emerson) Model IF98EZ-1621 Homeowner's User Guide, White Rodgers, Jan. 25, 2012, 28 pages.
Akhlaghinia et al., Occupancy Monitoring in Intelligent Environment through Integrated Wireless Localizing Agents, IEEE, 2009, 7 pages.
Akhlaghinia et al., Occupant Behaviour Prediction in Ambient Intelligence Computing Environment, Journal of Uncertain Systems, vol. 2, No. 2, 2008, pp. 85-100.
Allen et al., Real-Time Earthquake Detection and Hazard Assessment by ElarmS Across California, Geophysical Research Letters, vol. 36, L00B08, 2009, pp. 1-6.
Chatzigiannakis et al., Priority Based Adaptive Coordination of Wireless Sensors and Actors, Q2SWinet '06, Oct. 2006, pp. 37-44.
Deleeuw, Ecobee WiFi Enabled Smart Thermostat Part 2: The Features Review, retrieved from <URL: http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao et al., The Self-Programming Thermostat: Optimizing Setback Schedules Based on Home Occupancy Patterns, in Proceedings of the First ACM Workshop on Embedded Sensing Systems for Energy-Efficiency in Buildings, Nov. 3, 2009, 6 pages.
Loisos et al., Buildings End-Use Energy Efficiency: Alternatives to Compressor Cooling, California Energy Commission, Public Interest Energy Research, Jan. 2000, 80 pages.
Lu et al., The Smart Thermostat: Using Occupancy Sensors to Save Energy in Homes, in Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02, 1998, pp. 110-114.
Ros et al., Multi-Sensor Human Tracking with the Bayesian Occupancy Filter, IEEE, 2009, 8 pages.
Wong et al., Maximum Likelihood Estimation of ARMA Model with Error Processes for Replicated Observations, National University of Singapore, Department of Economics, Working Paper No. 0217, Feb. 2002, pp. 1-19.
International Application No. PCT/US2011/058848, International Search Report & Written Opinion mailed on Apr. 10, 2012, 8 pages.
International Application No. PCT/US2011/058848, International Preliminary Report on Patentability mailed on May 8, 2013, 6 pages.
International Application No. PCT/US2012/020026, International Search Report & Written Opinion mailed on May 3, 2012, 7 pages.
International Application No. PCT/US2012/020026, International Preliminary Report on Patentability mailed on Jul. 2, 2013, 7 pages.
International Application No. PCT/US2012/030084, International Preliminary Report on Patentability mailed on May 1, 2014, 8 pages.
International Application No. PCT/US2012/030084, International Search Report and Written Opinion mailed on Jul. 6, 2012, 6 pages.

\* cited by examiner

METHODS FOR ENCOURAGING ENERGY-EFFICIENT BEHAVIORS BASED ON A NETWORK CONNECTED THERMOSTAT-CENTRIC ENERGY EFFICIENCY PLATFORM

This application is a U.S. national phase application under 35 U.S.C. §371 based upon International Application No. PCT/US2012/020026, filed Jan. 3, 2012, which claims the priority benefit of and is a continuation-in-part of U.S. Ser. No. 13/317,423 filed 17 Oct. 2011, which claims the priority benefit of U.S. Prov. Ser. No. 61/429,093 filed 31 Dec. 2010, each of which is incorporated by reference herein.

FIELD

This patent specification relates to systems, methods, and related computer program products for the monitoring and control of energy-consuming systems or other resource-consuming systems. More particularly, this patent specification relates to methods for encouraging energy-efficient behaviors based on a network connected thermostat-centric energy efficiency platform.

BACKGROUND

Substantial effort and attention continues toward the development of newer and more sustainable energy supplies. The conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

It is beneficial, at both a societal level and on a per-home basis, for a large number of homes to have their existing older thermostats replaced by newer, microprocessor controlled "intelligent" thermostats having more advanced HVAC control capabilities that can save energy while also keeping the occupants comfortable. To do this, these thermostats will need more information from the occupants as well as the environments where the thermostats are located. Preferably, these thermostats will also be capable of connection to computer networks, including both local area networks (or other "private" networks) and wide area networks such as the Internet (or other "public" networks), in order to obtain current and forecasted outside weather data, cooperate in so-called demand-response programs (e.g., automatic conformance with power alerts that may be issued by utility companies during periods of extreme weather), enable users to have remote access and/or control thereof through their network-connected device (e.g., smartphone, tablet computer, PC-based web browser), and other advanced functionalities that may require network connectivity.

Since settings made by the user, such as setpoint temperatures, have a great impact of energy savings, it would be beneficial to encourage users to adopt increased energy-saving behaviors and thermostat settings that are made possible with a network-connected user-friendly thermostat.

It is to be appreciated that although exemplary embodiments are presented herein for the particular context of HVAC system control, there are a wide variety of other resource usage contexts for which the embodiments are readily applicable including, but not limited to, water usage, air usage, the usage of other natural resources, and the usage of other (i.e., non-HVAC-related) forms of energy, as would be apparent to the skilled artisan in view of the present disclosure. Therefore, such application of the embodiments in such other resource usage contexts is not outside the scope of the present teachings.

SUMMARY

Provided according to one or more embodiments are methods for encouraging a user to adopt energy-efficient settings on a network-connected thermostat installed in an enclosure. According to some embodiments, the method includes calculating a current value for a stand alone performance metric measuring energy efficiency associated with the enclosure, the metric being based on information gathered from the thermostat; comparing the calculated current value with a historical value for the stand alone performance metric, the historical value being based on information gathered corresponding to previous thermostat settings; and awarding an incentive reward to the user if the calculated current value is better than the historical value. According to some embodiments, the thermostat is connected to one or more devices in the enclosure and the stand-alone performance metric is based only on information gathered from the thermostat and from the one or more devices in the enclosure. According to some embodiments, the stand-alone performance metric is based on an amount of time an HVAC system installed in the enclosure is actively cycled on.

According to some embodiments the method includes receiving a first value for a performance metric measuring energy efficiency associated with a first enclosure having a first network-connected thermostat controlling a first HVAC system installed therein, and a second value for the performance metric measuring energy efficiency associated with a second enclosure having a second network-connected thermostat controlling a second HVAC system installed therein; comparing the first value with the second value; and awarding an incentive reward to either a first user associated with the first thermostat or a second user associated with the second thermostat, the awarding being based on the comparison. According to some embodiments the first user and the second user are members of a competition group whose members are selected based at least in part on geographic location and/or are facilitated by a third party social networking service. According to some embodiments, the competition group includes one or more other users of network-connected thermostats, the comparing includes ranking the members of the competition group, and the awarding is based on the ranking.

According to some embodiments, the method includes calculating a value for a performance metric measuring energy efficiency associated with an enclosure having an HVAC system controlled by the network-connected thermostat; and awarding a video game based incentive reward to the user based on the calculated value for the performance metric. Preferably, the thermostat and/or a cloud server associated with the operation of the thermostat is in networked data communication with a video game playing device in the enclosure that runs the video game and/or with an online gaming environment corresponding to the video game, and the video game based incentive reward is selected based at least in part on information obtained from the video game playing device and/or the online gaming environment.

According to some embodiments, the method includes receiving from a first user a set of thermostat settings for use on a network-connected thermostat installed in a first enclosure; receiving a request from a second user to obtain the set of thermostat settings received from the first user to use in a second network-connected thermostat installed in a second enclosure; and in response to the request, sending the set of thermostat settings for use with the second network-connected thermostat. The set of settings can at least partially define an algorithm used by, or may include setpoint settings for, a network-connected thermostat. According to some embodiments, the first user notifies the second user of the first set of thermostat settings, and the notification is facilitated by third party social networking service. The second user may offer feedback associated with the first set of thermostat settings, and a third network-connected thermostat user may view the feedback and, based at least partly thereon, request the set of settings.

Provided according to one or more embodiments are systems adapted and configured to encouraging a user to adopt energy-efficient settings on a network-connected thermostat according to one or more of the methods described herein.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
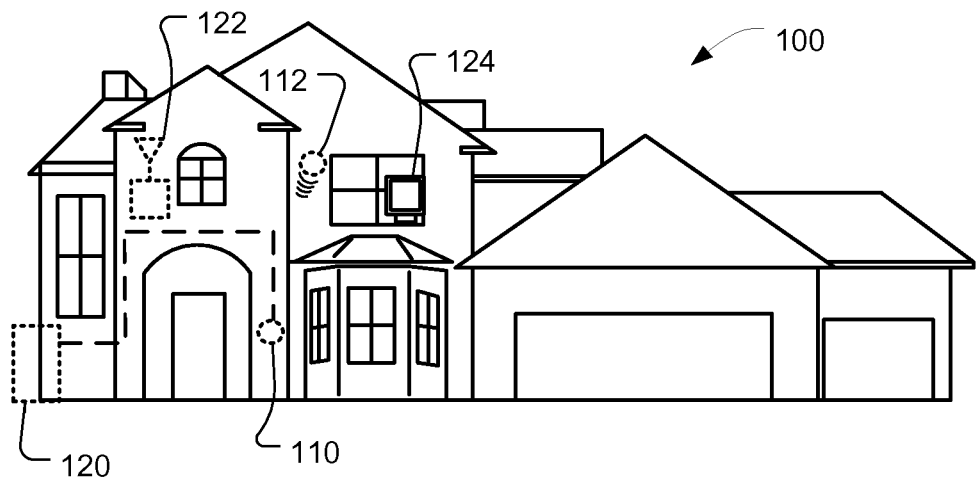
FIG. 1 is a diagram of an enclosure in which environmental conditions are controlled, according to some embodiments.

The subject matter of this patent specification relates to the subject matter of the following commonly assigned applications, each of which is incorporated by reference herein: U.S. Ser. No. 12/881,430 filed Sep. 14, 2010; U.S. Ser. No. 12/881,463 filed Sep. 14, 2010; U.S. Prov. Ser. No. 61/415,771 filed Nov. 19, 2010; U.S. Prov. Ser. No. 61/429,093 filed Dec. 31, 2010; U.S. Ser. No. 12/984,602 filed Jan. 4, 2011; U.S. Ser. No. 12/987,257 filed Jan. 10, 2011; U.S. Ser. No. 13/033,573 filed Feb. 23, 2011; U.S. Ser. No. 29/386,021, filed Feb. 23, 2011; U.S. Ser. No. 13/034,666 filed Feb. 24, 2011; U.S. Ser. No. 13/034,674 filed Feb. 24, 2011; U.S. Ser. No. 13/034,678 filed Feb. 24, 2011; U.S. Ser. No. 13/038,191 filed Mar. 1, 2011; U.S. Ser. No. 13/038,206 filed Mar. 1, 2011; U.S. Ser. No. 29/399,609 filed Aug. 16, 2011; U.S. Ser. No. 29/399,614 filed Aug. 16, 2011; U.S. Ser. No. 29/399,617 filed Aug. 16, 2011; U.S. Ser. No. 29/399,618 filed Aug. 16, 2011; U.S. Ser. No. 29/399,621 filed Aug. 16, 2011; U.S. Ser. No. 29/399,623 filed Aug. 16, 2011; U.S. Ser. No. 29/399,625 filed Aug. 16, 2011; U.S. Ser. No. 29/399,627 filed Aug. 16, 2011; U.S. Ser. No. 29/399,630 filed Aug. 16, 2011; U.S. Ser. No. 29/399,632 filed Aug. 16, 2011; U.S. Ser. No. 29/399,633 filed Aug. 16, 2011; U.S. Ser. No. 29/399,636 filed Aug. 16, 2011; U.S. Ser. No. 29/399,637 filed Aug. 16, 2011; U.S. Ser. No. 13/199,108, filed Aug. 17, 2011; U.S. Ser. No. 13/267,871 filed Oct. 6, 2011; U.S. Ser. No. 13/267,877 filed Oct. 6, 2011; U.S. Ser. No. 13/269,501, filed Oct. 7, 2011; U.S. Ser. No. 29/404,096 filed Oct. 14, 2011; U.S. Ser. No. 29/404,097 filed Oct. 14, 2011; U.S. Ser. No. 29/404,098 filed Oct. 14, 2011; U.S. Ser. No. 29/404,099 filed Oct. 14, 2011; U.S. Ser. No. 29/404,101 filed Oct. 14, 2011; U.S. Ser. No. 29/404,103 filed Oct. 14, 2011; U.S. Ser. No. 29/404,104 filed Oct. 14, 2011; U.S. Ser. No. 29/404,105 filed Oct. 14, 2011; U.S. Ser. No. 13/275,307 filed Oct. 17, 2011; U.S. Ser. No. 13/275,311 filed Oct. 17, 2011; U.S. Ser. No. 13/317,423 filed Oct. 17, 2011; U.S. Ser. No. 13/279,151 filed Oct. 21, 2011; U.S. Ser. No. 13/317,557 filed Oct. 21, 2011; U.S. Prov. Ser. No. 61/627,996 filed Oct. 21, 2011; PCT/US11/61339 filed Nov. 18, 2011; PCT/US11/61344 filed Nov. 18, 2011; PCT/US11/61365 filed Nov. 18, 2011; PCT/US11/61379 filed Nov. 18, 2011; PCT/US11/61391 filed Nov. 18, 2011; PCT/US11/61479 filed Nov. 18, 2011; PCT/US11/61457 filed Nov. 18, 2011; and PCT/US11/61470 filed Nov. 18, 2011; PCT/US11/61339 filed Nov. 18, 2011; PCT/US11/61491 filed Nov. 18, 2011; PCT/US11/61437 filed Nov. 18, 2011; and PCT/US11/61503 filed Nov. 18, 2011. The above-referenced patent applications are collectively referenced herein as "the commonly assigned incorporated applications."

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to the thermostat are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. Although many of the embodiments are described herein as being carried out by a thermostat such as thermostat 110, according to some embodiments, the same or similar techniques are employed using a remote device such as device 112.

Some embodiments of thermostat 110 in FIG. 1 incorporate one or more sensors to gather data from the environment associated with enclosure 100. Sensors incorporated in thermostat 110 may detect occupancy, temperature, light and other environmental conditions and influence the control and operation of HVAC system 120. Sensors incorporated within thermostat 110 do not protrude from the surface of the thermostat 110 thereby providing a sleek and elegant design that does not draw attention from the occupants in a house or other enclosure. As a result, thermostat 110 and readily fits with almost any décor while adding to the overall appeal of the interior design.

As used herein, a "learning" thermostat refers to a thermostat, or one of plural communicating thermostats in a multi-thermostat network, having an ability to automatically establish and/or modify at least one future setpoint in a heating and/or cooling schedule based on at least one automatically sensed event and/or at least one past or current user input. As used herein, a "primary" thermostat refers to a thermostat that is electrically connected to actuate all or part of an HVAC system, such as by virtue of electrical connection to HVAC control wires (e.g. W, G, Y, etc.) leading to the HVAC system. As used herein, an "auxiliary" thermostat refers to a thermostat that is not electrically connected to actuate an HVAC system, but that otherwise contains at least one sensor and influences or facilitates primary thermostat control of an HVAC system by virtue of data communications with the primary thermostat. In one particularly useful scenario, the thermostat 110 is a primary learning thermostat and is wall-mounted and connected to all of the HVAC control wires, while the remote thermostat 112 is an auxiliary learning thermostat positioned on a nightstand or dresser, the auxiliary learning thermostat being similar in appearance and user-interface features as the primary learning thermostat, the auxiliary learning thermostat further having similar sensing capabilities (e.g., temperature, humidity, motion, ambient light, proximity) as the primary learning thermostat, but the auxiliary learning thermostat not being connected to any of the HVAC wires. Although it is not connected to any HVAC wires, the auxiliary learning thermostat wirelessly communicates with and cooperates with the primary learning thermostat for improved control of the HVAC system, such as by providing additional temperature data at its respective location in the enclosure, providing additional occupancy information, providing an additional user interface for the user, and so forth.

It is to be appreciated that while certain embodiments are particularly advantageous where the thermostat 110 is a primary learning thermostat and the remote thermostat 112 is an auxiliary learning thermostat, the scope of the present teachings is not so limited. Thus, for example, while certain initial provisioning methods that automatically pair associate a network-connected thermostat with an online user account are particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of further example, while certain graphical user interfaces for remote control of a thermostat may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors. By way of even further example, while certain methods for cooperative, battery-conserving information polling of a thermostat by a remote cloud-based management server may be particularly advantageous where the thermostat is a primary learning thermostat, the methods are more generally applicable to scenarios involving primary non-learning thermostats, auxiliary learning thermostats, auxiliary non-learning thermostats, or other types of network-connected thermostats and/or network-connected sensors.

Enclosure 100 further includes a private network accessible both wirelessly and through wired connections and may also be referred to as a Local Area Network or LAN. Network devices on the private network include a computer 124, thermostat 110 and remote thermostat 112 in accordance with some embodiments of the present invention. In one embodiment, the private network is implemented using an integrated router 122 that provides routing, wireless access point functionality, firewall and multiple wired connection ports for connecting to various wired network devices, such as computer 124. Other embodiments may instead use multiple discrete switches, routers and other devices (not shown) to perform networking functions equivalent to or in addition to those provided by integrated router 122.

Integrated router 122 further provides network devices access to a public network, such as the Internet, provided enclosure 100 has a connection to the public network generally through a cable-modem, DSL modem and a service provider of the Internet or other public network. The Internet and other public networks are sometimes referred to as a Wide-Area Network or WAN. In one embodiment, integrated router 122 may direct communications to other devices on these networks using a network protocol such as TCP/IP. If the communications is directed to a device or service outside the private network, integrated router 122 may route the communications outside the private network to the public network such as the Internet.

In some embodiments, thermostat 110 may wirelessly communicate with remote thermostat 112 over the private network or through an ad hoc network formed directly with remote thermostat 112. During communication with remote thermostat 112, thermostat 110 may gather information remotely from the user and from the environment detectable by the remote thermostat 112. For example, remote thermostat 112 may wirelessly communicate with the thermostat 110 providing user input from the remote location of remote thermostat 112 or may be used to display information to a user, or both. Like thermostat 110, embodiments of remote thermostat 112 may also include sensors to gather data related to occupancy, temperature, light and other environmental conditions. In an alternate embodiment, remote thermostat 112 may also be located outside of the enclosure 100.

In accordance with some embodiments, a computer device 124 in enclosure 100 may remotely control thermostat 110 by accessing a thermostat management account through a thermostat management system (not shown in FIG. 1) located on a public network such as the Internet. The thermostat management system passes control information over the network back to thermostat 110 provided the thermostat 110 is also associated or paired to the thermostat management account on the thermostat management system. Data collected by thermostat 110 also passes from the private network associated with enclosure 100 through integrated router 122 and to the thermostat management system over the public network. Other computer devices not in enclosure 100 such as Smartphones, laptops and tablet computers (not shown in FIG. 1) may also control thermostat 110 provided they have access to the public network and both the thermostat management system and thermostat management account. Further details on accessing the public network, such as the Internet, and a thermostat like thermostat 110 in accordance with embodiments of the present invention is described in further detail later herein.

Figure 2:
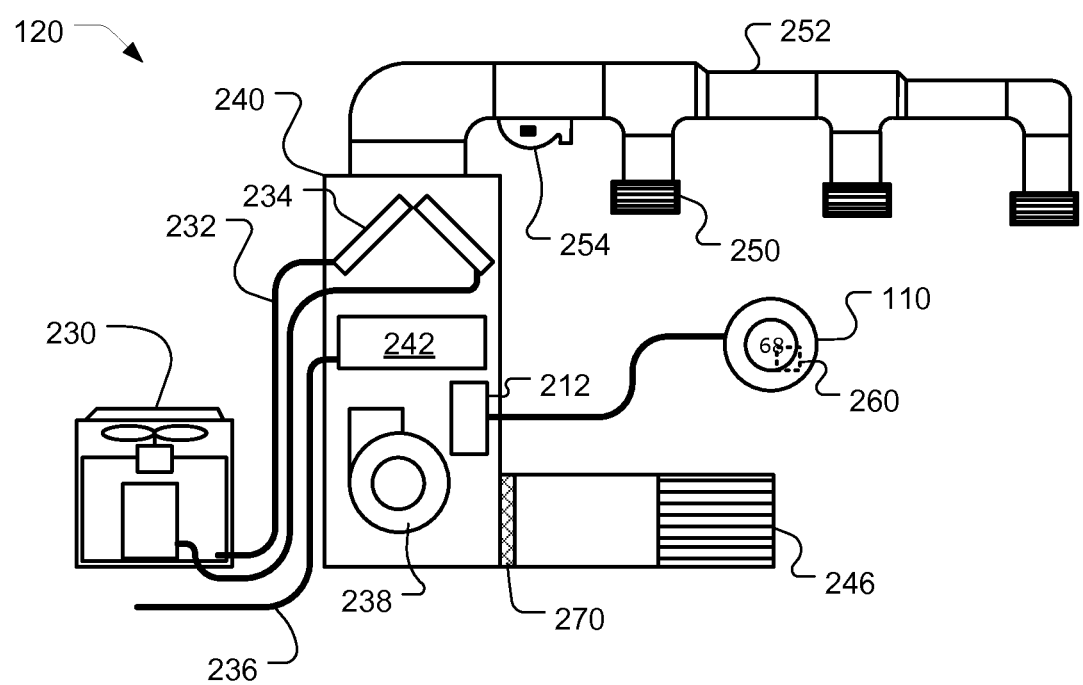
FIG. 2 is a diagram of an HVAC system, according to some embodiments.

FIG. 2 is a schematic diagram of an HVAC system, according to some embodiments. HVAC system 120 provides heating, cooling, ventilation, and/or air handling for the enclosure 100, such as a single-family home depicted in FIG. 1. System 120 depicts a forced air type heating and cooling system, although according to other embodiments, other types of HVAC systems could be used such as radiant heat based systems, heat-pump based systems, and others.

In heating, heating coils or elements 242 within air handler 240 provide a source of heat using electricity or gas via line 236. Cool air is drawn from the enclosure via return air duct 246 through filter 270, using fan 238 and is heated through heating coils or elements 242. The heated air flows back into the enclosure at one or more locations via supply air duct system 252 and supply air registers such as register 250. In cooling, an outside compressor 230 passes a gas such as Freon through a set of heat exchanger coils to cool the gas. The gas then goes through line 232 to the cooling coils 234 in the air handler 240 where it expands, cools and cools the air being circulated via fan 238. A humidifier 254 may optionally be included in various embodiments that returns moisture to the air before it passes through duct system 252. Although not shown in FIG. 2, alternate embodiments of HVAC system 120 may have other functionality such as venting air to and from the outside, one or more dampers to control airflow within the duct system 252 and an emergency heating unit. Overall operation of HVAC system 120 is selectively actuated by control electronics 212 communicating with thermostat 110 over control wires 248.

Figure 3A:
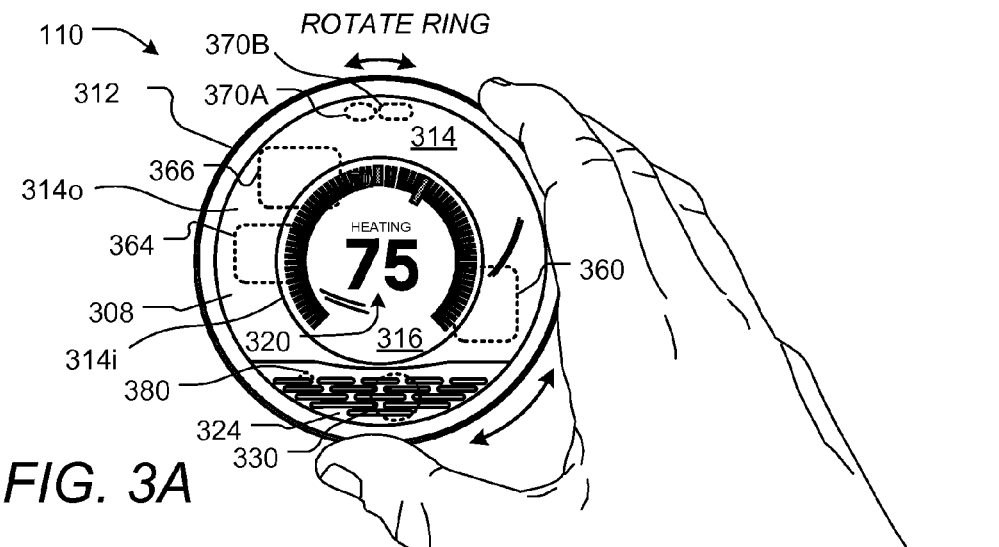
FIGS. 3A-3B illustrate a thermostat having a user-friendly interface, according to some embodiments.
Figure 3B:
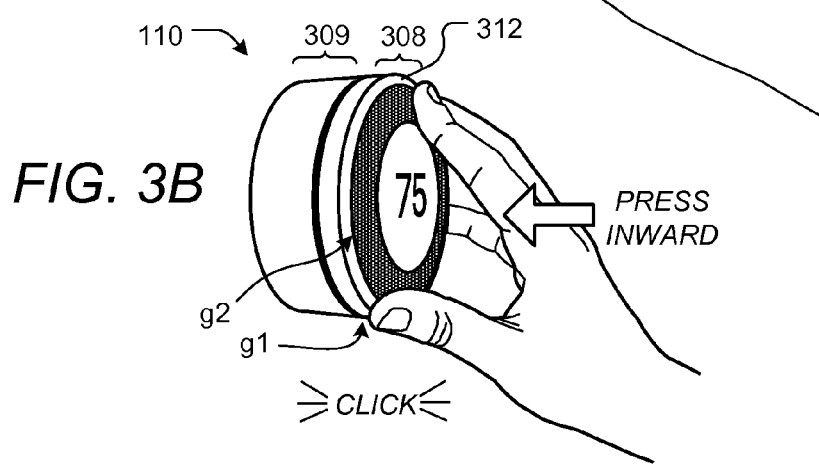

FIGS. 3A-3B illustrate a thermostat having a user-friendly interface, according to some embodiments. Unlike many prior art thermostats, thermostat 110 preferably has a sleek, simple, uncluttered and elegant design that does not detract from home decoration, and indeed can serve as a visually pleasing centerpiece for the immediate location in which it is installed. Moreover, user interaction with thermostat 110 is facilitated and greatly enhanced over known conventional thermostats by the design of thermostat 110. The thermostat 110 includes control circuitry and is electrically connected to an HVAC system, such as is shown in FIGS. 1 and 2. Thermostat 110 is wall mounted, is circular in shape, and has an outer rotatable ring 312 for receiving user input. Thermostat 110 is circular in shape in that it appears as a generally disk-like circular object when mounted on the wall. Thermostat 110 has a large front face lying inside the outer ring 312. According to some embodiments, thermostat 110 is approximately 80 mm in diameter. The outer rotatable ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. The front face of the thermostat 110 comprises a clear cover 314 that according to some embodiments is polycarbonate, and a metallic portion 324 preferably having a number of slots formed therein as shown. According to some embodiments, the surface of cover 314 and metallic portion 324 form a common outward arc or spherical shape gently arcing outward, and this gentle arcing shape is continued by the outer ring 312.

Although being formed from a single lens-like piece of material such as polycarbonate, the cover 314 has two different regions or portions including an outer portion 314o and a central portion 314i. According to some embodiments, the cover 314 is painted or smoked around the outer portion 314o, but leaves the central portion 314i visibly clear so as to facilitate viewing of an electronic display 316 disposed thereunderneath. According to some embodiments, the curved cover 314 acts as a lens that tends to magnify the information being displayed in electronic display 316 to users. According to some embodiments the central electronic display 316 is a dot-matrix layout (individually addressable) such that arbitrary shapes can be generated, rather than being a segmented layout. According to some embodiments, a combination of dot-matrix layout and segmented layout is employed. According to some embodiments, central display 316 is a backlit color liquid crystal display (LCD). An example of information displayed on the electronic display 316 is illustrated in FIG. 3A, and includes central numerals 320 that are representative of a current setpoint temperature. According to some embodiments, metallic portion 324 has number of slot-like openings so as to facilitate the use of a passive infrared motion sensor 330 mounted therebeneath. The metallic portion 324 can alternatively be termed a metallic front grille portion. Further description of the metallic portion/front grille portion is provided in the commonly assigned U.S. Ser. No. 13/199,108, supra. The thermostat 110 is preferably constructed such that the electronic display 316 is at a fixed orientation and does not rotate with the outer ring 312, so that the electronic display 316 remains easily read by the user. For some embodiments, the cover 314 and metallic portion 324 also remain at a fixed orientation and do not rotate with the outer ring 312. According to one embodiment in which the diameter of the thermostat 110 is about 80 mm, the diameter of the electronic display 316 is about 45 mm. According to some embodiments an LED indicator 380 is positioned beneath portion 324 to act as a low-power-consuming indicator of certain status conditions. For, example the LED indicator 380 can be used to display blinking red when a rechargeable battery of the thermostat (see FIG. 4A, infra) is very low and is being recharged. More generally, the LED indicator 380 can be used for communicating one or more status codes or error codes by virtue of red color, green color, various combinations of red and green, various different blinking rates, and so forth, which can be useful for troubleshooting purposes.

Motion sensing as well as other techniques can be use used in the detection and/or predict of occupancy, as is described further in the commonly assigned U.S. Ser. No. 12/881,430, supra. According to some embodiments, occupancy information is used in generating an effective and efficient scheduled program. Preferably, an active proximity sensor 370A is provided to detect an approaching user by infrared light reflection, and an ambient light sensor 370B is provided to sense visible light. The proximity sensor 370A can be used to detect proximity in the range of about one meter so that the thermostat 110 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place. The ambient light sensor 370B can be used for a variety of intelligence-gathering purposes, such as for facilitating confirmation of occupancy when sharp rising or falling edges are detected (because it is likely that there are occupants who are turning the lights on and off), and such as for detecting long term (e.g., 24-hour) patterns of ambient light intensity for confirming and/or automatically establishing the time of day.

According to some embodiments, for the combined purposes of inspiring user confidence and further promoting visual and functional elegance, the thermostat 110 is controlled by only two types of user input, the first being a rotation of the outer ring 312 as shown in FIG. 3A (referenced hereafter as a "rotate ring" or "ring rotation" input), and the second being an inward push on an outer cap 308 (see FIG. 3B) until an audible and/or tactile "click" occurs (referenced hereafter as an "inward click" or simply "click" input). For the embodiment of FIGS. 3A-3B, the outer cap 308 is an assembly that includes all of the outer ring 312, cover 314, electronic display 316, and metallic portion 324. When pressed inwardly by the user, the outer cap 308 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound. Thus, for the embodiment of FIGS. 3A-3B, an inward click can be achieved by direct pressing on the outer ring 312 itself, or by indirect pressing of the outer ring by virtue of providing inward pressure on the cover 314, metallic portion 314, or by various combinations thereof. For other embodiments, the thermostat 110 can be mechanically configured such that only the outer ring 312 travels inwardly for the inward click input, while the cover 314 and metallic portion 324 remain motionless. It is to be appreciated that a variety of different selections and combinations of the particular mechanical elements that will travel inwardly to achieve the "inward click" input are within the scope of the present teachings, whether it be the outer ring 312 itself, some part of the cover 314, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 312 has been found particularly advantageous, since the user's fingers do not need to be lifted out of contact with the device, or slid along its surface, in order to go between ring rotations and inward clicks. Moreover, by virtue of the strategic placement of the electronic display 316 centrally inside the rotatable ring 312, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. No. 13/033,573, supra, U.S. Ser. No. 29/386,021, supra, and U.S. Ser. No. 13/199,108, supra.

Figure 3C:
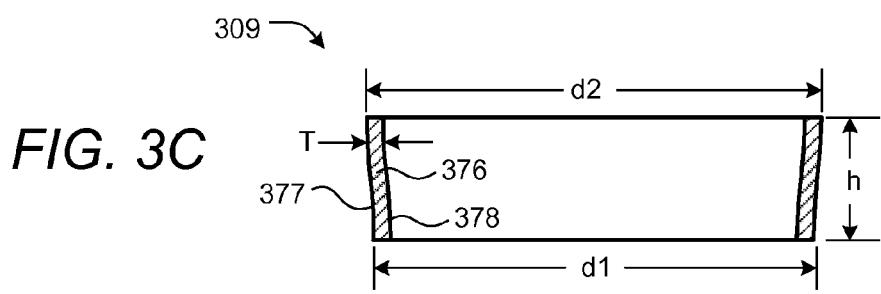
FIG. 3C illustrates a cross-sectional view of a shell portion of a frame of the thermostat of FIGS. 3A-3B.

FIG. 3C illustrates a cross-sectional view of a shell portion 309 of a frame of the thermostat of FIGS. 3A-B, which has been found to provide a particularly pleasing and adaptable visual appearance of the overall thermostat 110 when viewed against a variety of different wall colors and wall textures in a variety of different home environments and home settings. While the thermostat itself will functionally adapt to the user's schedule as described herein and in one or more of the commonly assigned incorporated applications, supra, the outer shell portion 309 is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles. The shell portion 309 has the shape of a frustum that is gently curved when viewed in cross-section, and comprises a sidewall 376 that is made of a clear solid material, such as polycarbonate plastic. The sidewall 376 is backpainted with a substantially flat silver- or nickel-colored paint, the paint being applied to an inside surface 378 of the sidewall 376 but not to an outside surface 377 thereof. The outside surface 377 is smooth and glossy but is not painted. The sidewall 376 can have a thickness T of about 1.5 mm, a diameter d1 of about 78.8 mm at a first end that is nearer to the wall when mounted, and a diameter d2 of about 81.2 mm at a second end that is farther from the wall when mounted, the diameter change taking place across an outward width dimension "h" of about 22.5 mm, the diameter change taking place in either a linear fashion or, more preferably, a slightly nonlinear fashion with increasing outward distance to form a slightly curved shape when viewed in profile, as shown in FIG. 3C. The outer ring 312 of outer cap 308 is preferably constructed to match the diameter d2 where disposed near the second end of the shell portion 309 across a modestly sized gap g1 therefrom, and then to gently arc back inwardly to meet the cover 314 across a small gap g2. It is to be appreciated, of course, that FIG. 3C only illustrates the outer shell portion 309 of the thermostat 110, and that there are many electronic components internal thereto that are omitted from FIG. 3C for clarity of presentation, such electronic components being described further hereinbelow and/or in other ones of the commonly assigned incorporated applications, such as U.S. Ser. No. 13/199,108, supra.

According to some embodiments, the thermostat 110 includes a processing system 360, display driver 364 and a wireless communications system 366. The processing system 360 is adapted to cause the display driver 364 and display area 316 to display information to the user, and to receiver user input via the rotatable ring 312. The processing system 360, according to some embodiments, is capable of carrying out the governance of the operation of thermostat 110 including the user interface features described herein. The processing system 360 is further programmed and configured to carry out other operations as described further hereinbelow and/or in other ones of the commonly assigned incorporated applications. For example, processing system 360 is further programmed and configured to maintain and update a thermodynamic model for the enclosure in which the HVAC system is installed, such as described in U.S. Ser. No. 12/881,463, supra, and in International Patent App. No. PCT/US11/51579, incorporated herein by reference. According to some embodiments, the wireless communications system 366 is used to communicate with devices such as personal computers and/or other thermostats or HVAC system components, which can be peer-to-peer communications, communications through one or more servers located on a private network, or and/or communications through a cloud-based service.

Figure 4:
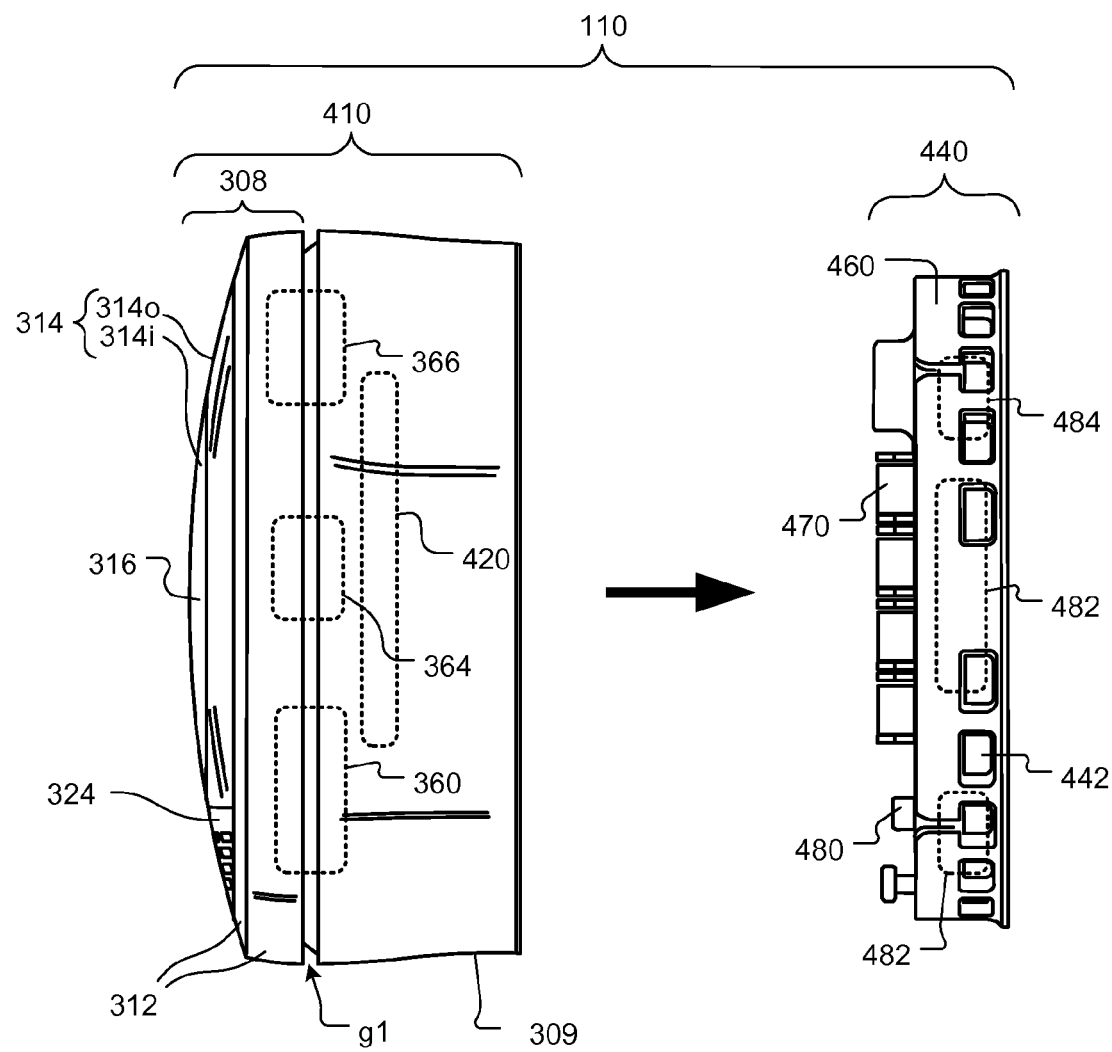
FIG. 4 illustrates a thermostat having a head unit and a backplate (or wall dock) for ease of installation, configuration and upgrading, according to some embodiments.

FIG. 4 illustrates a side view of the thermostat 110 including a head unit 410 and a backplate (or wall dock) 440 thereof for ease of installation, configuration and upgrading, according to some embodiments. As is described hereinabove, thermostat 110 is wall mounted and has circular in shape and has an outer rotatable ring 312 for receiving user input. Head unit 410 includes the outer cap 308 that includes the cover 314 and electronic display 316. Head unit 410 of round thermostat 110 is slidably mountable onto back plate 440 and slidably detachable therefrom. According to some embodiments the connection of the head unit 410 to backplate 440 can be accomplished using magnets, bayonet, latches and catches, tabs or ribs with matching indentations, or simply friction on mating portions of the head unit 410 and backplate 440. According to some embodiments, the head unit 410 includes a processing system 360, display driver 364 and a wireless communications system 366. Also shown is a rechargeable battery 420 that is recharged using recharging circuitry 422 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034, 674, and 13/034,678, which are incorporated by reference herein. According to some embodiments, rechargeable battery 420 is a single cell lithium-ion, or a lithium-polymer battery.

Backplate 440 includes electronics 482 and a temperature/humidity sensor 484 in housing 460, which are ventilated via vents 442. Two or more temperature sensors (not shown) are also located in the head unit 410 and cooperate to acquire reliable and accurate room temperature data. Wire connectors 470 are provided to allow for connection to HVAC system wires. Connection terminal 480 provides electrical connections between the head unit 410 and backplate 440. Backplate electronics 482 also includes power sharing circuitry for sensing and harvesting power available power from the HVAC system circuitry.

Figure 5A:
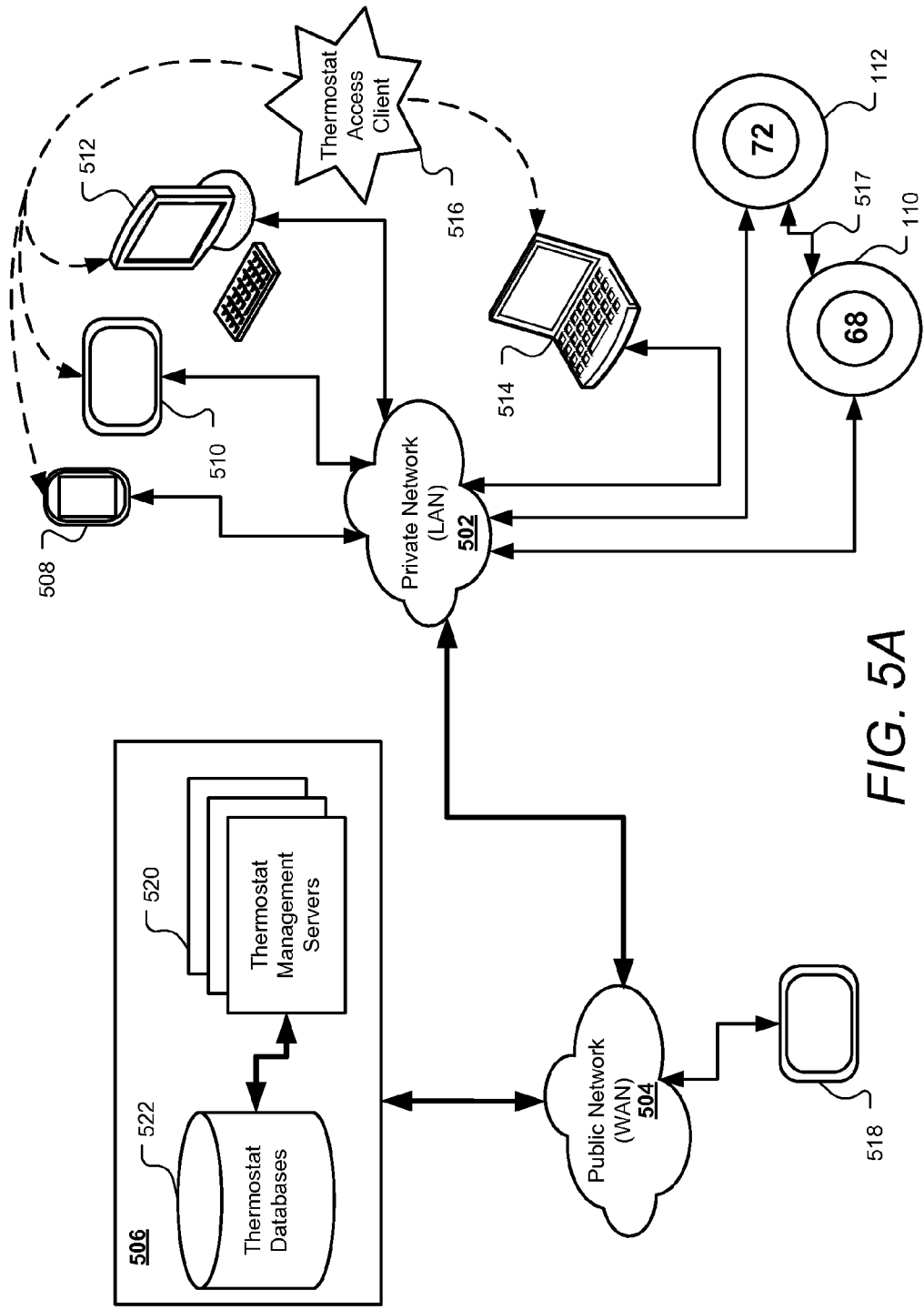
FIG. 5A illustrates thermostats and computers on a private network connected to a cloud-based thermostat management system designed in accordance with some embodiments.

FIG. 5A illustrates thermostats and computers on a private network 502 connected to a cloud-based thermostat management system 506 designed in accordance with some embodiments. In one embodiment, private network 502 is designed to provide network connectivity primarily within and near an enclosure, such as enclosure 100 in FIG. 1. Private network 502 additionally provides network connectivity for various devices such a smartphone 508, tablet 510, computer 512, and laptop 514, as well as the thermostat 110 and remote thermostat 112. A router (not shown) in private network 502, such as integrated router 122 in FIG. 1, may provide wired and wireless connectivity for these devices using a network protocol such as TCP/IP. Preferably, thermostat 110 and remote thermostat 112 are connected wirelessly to private network 502, for at least the reason that wired connections to the locations of the thermostats may not available, or it may be undesirable to incorporate such physical connections in either thermostat 110 or remote thermostat 112. For some embodiments, it is also possible for thermostat 110 and remote thermostat 112 to communicate directly with each other and other devices wireless using an ad hoc network 517 preferably setup directly between the devices and bypassing private network 502.

The embodiments described herein are advantageously configured to be compatible with a large variety of conventional integrated routers that service a large population of homes and businesses. Thus, by way of example only and not by way of limitation, the router (not shown) that services the private network 502 of FIG. 5A can be, for example, a D-Link DIR-655 Extreme N Wireless Router, a Netgear WNDR3700

RangeMax Dual Band Wireless USB Gigabit Router, a Buffalo Technology Nfiniti WZR-HP-G300NH Wireless-N Router, an Asus RT-N16 Wireless Router, Cisco Linksys E4200 Dual Band Wireless Router, or a Cisco Linksys E4200 Dual Band Wireless Router. Without loss of generality, some descriptions further hereinbelow will refer to an exemplary scenario in which the thermostats 110/112 are used in a home environment. However, it is to be appreciated that the described embodiments are not so limited, and are applicable to use of such thermostat(s) in any of a variety of enclosures including residential homes, business, vacation homes, hotels, hotel rooms, industrial facilities, and generally anywhere there is an HVAC system to be controlled.

Thermostat access client 516 is a client application designed in accordance with aspects of the present invention to access the thermostat management system 506 over public network 504. The term "thermostat management system" can be interchangeably referenced as a "cloud-based management server" for the thermostats, or more simply "cloud server", in various descriptions hereinabove and hereinbelow. Because thermostat access client 516 is designed to execute on different devices, multiple client applications may be developed using different technologies based on the requirements of the underlying device platform or operating system. For some embodiments, thermostat access client 516 is implemented such that end users operate their Internet-accessible devices (e.g., desktop computers, notebook computers, Internet-enabled mobile devices, cellphones having rendering engines, or the like) that are capable of accessing and interacting with the thermostat management system 506. The end user machine or device has a web browser (e.g., Internet Explorer, Firefox, Chrome, Safari) or other rendering engine that, typically, is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client. In a web environment, an end user accesses the site in the usual manner, i.e., by opening the browser to a URL associated with a service provider domain. The user may authenticate to the site (or some portion thereof) by entry of a username and password. The connection between the end user entity machine and the system may be private (e.g., via SSL). The server side of the system may comprise conventional hosting components, such as IP switches, web servers, application servers, administration servers, databases, and the like. Where AJAX is used on the client side, client side code (an AJAX shim) executes natively in the end user's web browser or other rendering engine. Typically, this code is served to the client machine when the end user accesses the site, although in the alternative it may be resident on the client machine persistently. Finally, while a web-based application over Internet Protocol (IP) is described, this is not a limitation, as the techniques and exposed user interface technologies may be provided by a standalone application in any runtime application, whether fixed line or mobile. It is to be appreciated that although the TCP/IP protocol is set forth as the network protocol used for communications among the thermostat management system 506, the thermostat access client 514, and other devices for some embodiments, it is set forth by way of example and not by way of limitation, with the use of any other suitable protocol, such as UDP over IP in particular, may be used without departing from the scope of the present teachings.

In yet another embodiment, thermostat access client 516 may be a stand-alone application or "app" designed to be downloaded and run on a specific device such as smartphone 508 or a tablet 510 device running the Apple iOS operating system, Android operating system, or others. Developers create these stand-alone applications using a set of application programming interfaces (APIs) and libraries provided by the device manufacturer packaged in software development toolkit or SDK. Once completed, the "app" is made available for download to the respective device through an application store or "app" store curated by the app store owners to promote quality, usability and customer satisfaction.

In one embodiment, thermostat management system 506 illustrated in FIG. 5A may be accessed over public network 504 by computer devices on private network 502 running thermostat access client 516. Thermostat access client 516 accesses a thermostat management account (not illustrated) provisioned by thermostat management system 506, on behalf of the computer devices, in order to access or control thermostat 110 or remote thermostat 112. In addition, a computer device on private network 502 such as computer 512 may use the thermostat access client 516 and thermostat management account on to gather data from thermostat 110 and remote thermostat 112.

Thermostat 110 and remote thermostat 112 may be accessed remotely from numerous different locations on the private network 502 or public network 504. As will be described in further detail hereinbelow, upon installation a thermostat such as thermostat 110 first registers with the thermostat management system 506 and then requests the thermostat management system create a pairing between the thermostat and a corresponding thermostat management account. Thereafter, a device such as a tablet 518 may be connected to public network 504 directly or through a series of other private networks (not shown) yet still access these thermostats, while outside the private network where they are located, by way of thermostat management system 506. In one embodiment, a tablet 518 running the Apple iOS operating system may remotely access to these thermostats through the thermostat management system 506 and thermostat management account using an iOS "app" version of thermostat access client 516. Pairing thermostats with the thermostat management account allows tablet 518 and other computer devices to remotely control, gather data, and generally interact with thermostats such as thermostat 110 and remote thermostat 112.

In one embodiment, thermostat management system 506 distributes the task of communication and control with the thermostats to one or more thermostat management servers 520. These thermostat management servers 520 may coordinate communication, manage access, process data and analyze results using data produced by thermostats such as thermostat 110 and remote thermostat 112. Intermediate and final results from computations on these servers 520, as well as raw data, may be stored temporarily or archived on thermostat databases 522 for future reference and use. Thermostat management servers 520 may also send a portion of the data along with control information, and more generally any of a variety of different kinds of information, back to thermostat 110 and remote thermostat 112. Results from the thermostat management servers 520 may also be stored in one or more thermostat databases 522 for subsequent access by a device such as tablet 518 running thermostat access client 516.

These thermostat management servers 520 each may perform one or several discrete functions, may serve as redundant fail-over servers for these different discrete functions or may share performance of certain discrete functions in tandem or in a cluster as well as other combinations performing more complex operations in parallel or distributed over one or more clusters of computers. In some embodiments, one of the thermostat management servers 520 may correspond directly to a physical computer or computing device while in other embodiments, the thermostat management servers 520 may be virtualized servers running on one or more physical computers under the control of a virtual machine computing environment such as provided by VMWARE of Palo Alto, Calif. or any other virtual machine provider. In yet another embodiment, the thermostat management servers 520 and thermostat databases 522 are provisioned from a "cloud" computing and storage environment such as the Elastic Compute Cloud or EC2 offering from Amazon.com of Seattle, Wash. In an EC2 solution, for example, the thermostat management servers 520 may be allocated according to processor cycles and storage requirements rather than according to a number of computers, either real or virtual, thought to be required for the task at hand.

Figure 5B:
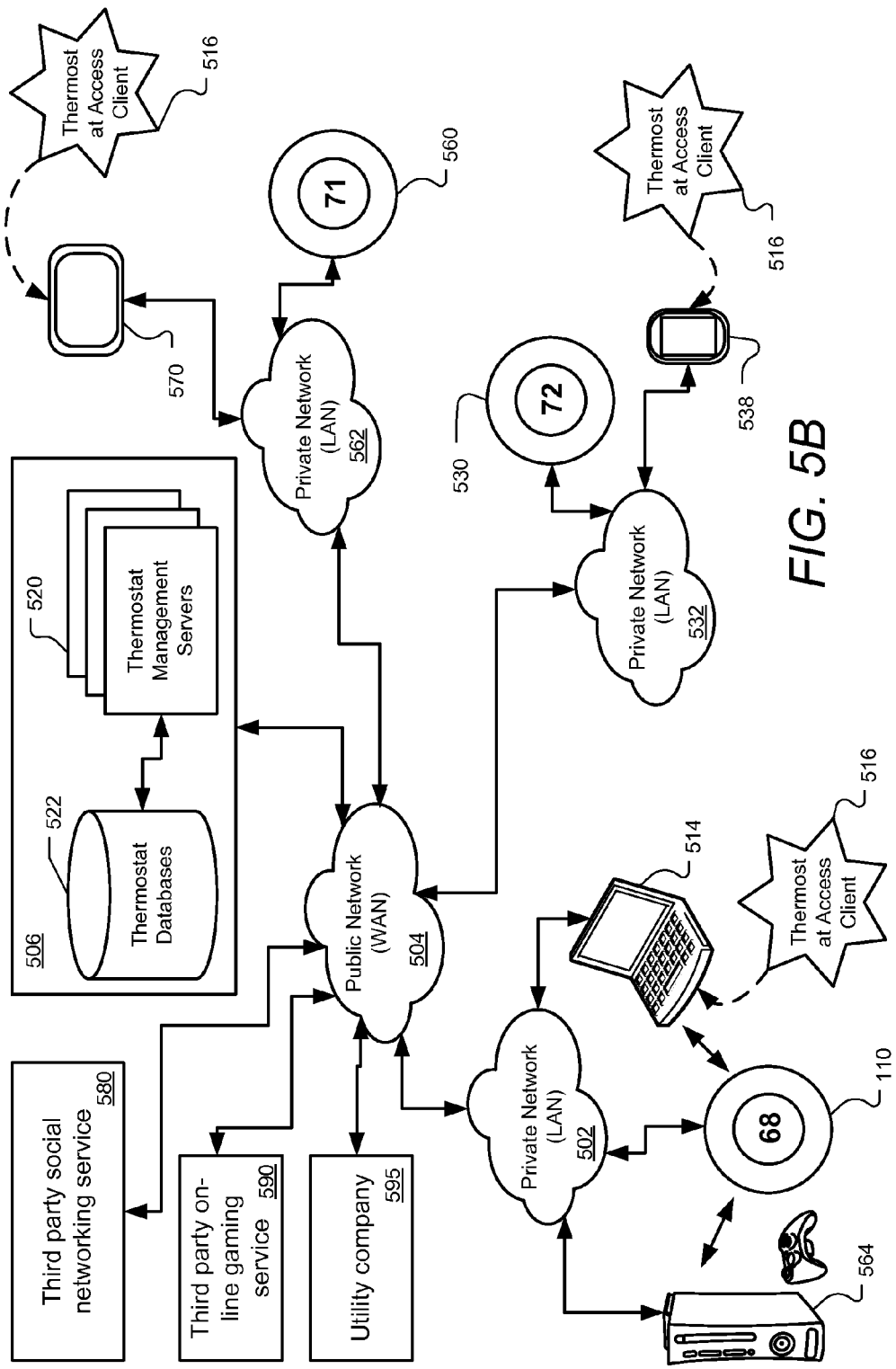
FIG. 5B illustrates a plurality of thermostats and other devices on plurality of private networks, according to some embodiments.

FIG. 5B illustrates a plurality of thermostats and other devices on plurality of private networks, according to some embodiments. Connected to the private network 502, in addition to the thermostat 110 and computer 514, are a number of other devices such as video game console 564. Through connection to private network 504 the thermostat 110 is able to interact with and serve as a "hub" for many appliances, devices and systems, as will be described in greater detail infra in relation to FIG. 7. Also shown are other private networks 532 and 562 each having user-friendly network-connected thermostat connected thereto. Each of the thermostats has the same or similar features as described with respect to thermostat 110. In particular, connected to private network 532 are user-friendly network-connected thermostat 530 and a smart phone 538 running a version of the thermostat access client 516. Connected to private network 562 are user-friendly network-connected thermostat 560 and a tablet 570 running a version of the thermostat access client 516. In this way, as will be described in greater detail herein, the respective users of the thermostats 110, 530 and 570 can share information (e.g. regarding the thermostats), and even compete with one another. As would be appreciated by one skilled in the art, although the computer 514, smart phone 538, and tablet 570 are illustrated in FIG. 5B as being connected directly through their respective private local area networks 502, 532, and 562 to the respective thermostats 110, 530, and 560 for clarity of presentation, it is not required that the devices running the thermostat access client 516 be connected directly to their private local area networks to access their respective thermostats, but rather these devices can generally establish data communication with their respective thermostats from anywhere in the world where there is an available Internet connection through which the thermostat management system 506 can be accessed.

Also shown connected to the public network 504 is a third party social networking service 580, a third-party on-line gaming service 590, and a utility company 595. Social networking service 580 is an online service, platform, or site such as Facebook and Twitter that focuses on building and reflecting of social networks or social relations among people, who, for example, share interests and/or activities. The social network services are web-based and thereby provide means for users to interact over the Internet, such as e-mail and instant messaging. The service 580 allows users to share ideas, activities, events, and interests. Preferably, the social networking service 580 contains category places (such as former school year or classmates), means to connect with friends (usually with self-description pages), and a recommendation system linked to trust. Besides Facebook and Twitter which are used worldwide, other examples of service 580 include, Nexopia, Bebo, VKontakte, Hi5, Hyves, Draugiem.lv, StudiVZ, iWiW, Tuenti, Nasza-Klasa, Decayenne, Tagged, XING, Badoo, Skyrock, Orkut, Mixi, Multiply, Wretch, renren, Cyworld, LinkedIn and Google+. Social network service 580, according to some embodiments, allows the users to share and review various settings, features and algorithms that pertain to the thermostats. According to some embodiment the users can compete with each as a means of encouraging energy-savings behavior.

On-line gaming service 590 are site(s), server(s), and/or service(s) that provide or facilitate video game play. In general on-line games can range from simple text based games to games incorporating complex graphics and virtual worlds populated by many players simultaneously. Many on-line games have associated online communities, making on-line games a form of social activity beyond single player games.

Examples of types of video games that can be facilitated using service 590 include one or more of the following games and/or series of games: action games, such as shooter games, first-person shooter games (e.g. Doom, Team Fortress, Halo, Killzone, Metroid Prime, Unreal Tournament, Call of Duty, and TimeSplitters), third-person shooter games, massively multiplayer online games (e.g. Happy Farm, World of Warcraft, Final Fantasy), and fighting games; adventure games; action-adventure games (Assassin's Creed); role-playing games (Pokémon, Final Fantasy and Dragon Quest), simulation games (e.g. The Sims, Alter Ego, Animal Crossing, Harvest Moon, Jones in the Fast Lane, Little Computer People, Miami Nights: Singles in the City, Shin Megami Tensei: Persona, Singles: Flirt Up Your Life, and Tokimeki Memorial); social simulation games (e.g. FrontierVille, CityVille, Gardens of Time, FarmVille and The Sims Social); strategy games (e.g. Civilization, Heroes of Might and Magic, Panzer General, Age of Wonders); on-line collectable card games (e.g. Magic: The Gathering Online, Alteil, Astral Masters and Astral Tournament) music games (e.g. Guitar Hero, Audition Online, and X-Beat); dance games (e.g. Dance Dance Revolution); party games; puzzle games; sports games (e.g. FIFA, NBA Live, Madden Football, NHL, and Tiger Woods); racing games (e.g. Forza, Gran Turismo, and Mario Kart); trivia games; video games directed to different target age groups ranging from games intended for children, to games intended for teens, to games intended for adults; and educational games.

According to some embodiments, incentives and/or rewards can be awarded to users to provide encouragement to adopt energy-saving behaviors, as facilitated by the network-connected thermostat and associated home energy network platform as described herein. Examples of incentives and/or rewards include: points, credits, lives, money (e.g. coins or cash), status, cheat codes, unlock codes, hit or health points, experience points or levels, gifts, games items (such as weapons, buildings, farm animals, and cars), decorations, game players (e.g. draft picks) or allies, and game-related merchandise (such as souvenirs, clothing, toys, license plate covers, and action figures).

Figure 6:
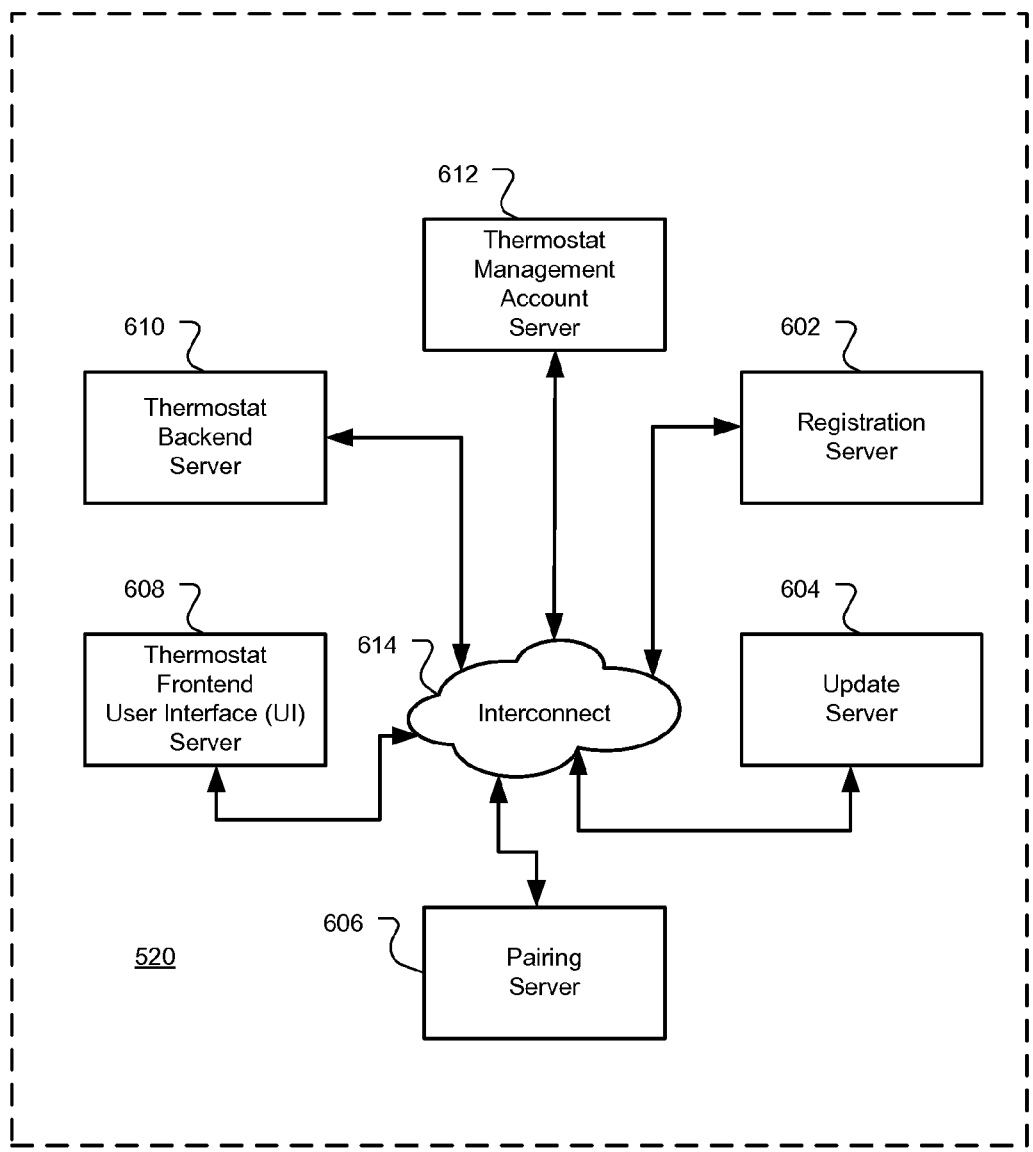
FIG. 6 illustrates one combination of thermostat management servers used to implement a thermostat management system in accordance with some embodiments.

FIG. 6 illustrates one combination of thermostat management servers 520 used to implement a thermostat management system 506 in accordance with some embodiments. In one embodiment, the thermostat management system 506 includes a registration server 602, an update server 604, a pairing server 606, a thermostat frontend user interface (UI) server 608, a thermostat backend server 610, and a thermostat management account server 612. Interconnect 614 may connect servers using one or more high-speed network connections, a shared back plane, a combination of local and remote high-speed connections as well as one or more virtualized connections. While the configuration of thermostat management servers 520 is exemplary, it is should not be considered limiting in any way and it is contemplated that the distribution of functions may be handled through a different combination of servers and distribution of function over those servers.

In some embodiments, the thermostat management servers 520 making up this thermostat management system 506 may manage thermostats located in multiple enclosures across various geographic locations and time zones. Each enclosure may use one or several thermostats in accordance with embodiments of the present invention to control one or several HVAC systems, such as HVAC system 120 in FIG. 1. In some cases, there may be an increased need from the thermostat management system 506 for certain functions and therefore more servers to deliver these functional capabilities. It may be appreciated that the design of thermostat management system 506 and use of the thermostat management servers 520 may be scaled to meet these demands on the system and efficiently track and organize the data from these multiple enclosures and thermostats for processing, analysis, control and machine-learning purposes.

One embodiment of registration server 602 provides a number of services related to registering a thermostat on the thermostat management system 506 and preparing it for pairing with a thermostat management account. In operation, the registration server 602 may be first accessed by a thermostat when the thermostat is wired to the HVAC of an enclosure and then connected to the Internet through a private network. To make the thermostat known on system 520, the thermostat sends thermostat metadata from the private network to the public network, such as the Internet, and then onto processing by registration server 602. Preferably, the thermostat metadata includes a unique thermostat identifier, such as one that is assigned at the time of manufacturing. As the communication that sends the thermostat metadata passes through the network address translator (NAT) of the router (not shown) that serves the associated private network (502, 532, 562), it is appended with the public network address of that router, which is thus the public address that is "used" by the thermostat to communicate over the public network. The thermostat identifier is used to identify the thermostat from other thermostats being registered by registration server 602 and may be based, in part or in whole, on a media access control (MAC) address assigned to the NIC of the thermostat. As one security measure against registering unauthorized devices, registration server 602 may compare the MAC address in the thermostat metadata against a list of valid MAC addresses provided by the manufacturer of the thermostat or NIC component. In accordance with one embodiment, the thermostat registration is complete when the registration server 602 provisions an entry in a thermostat registration pool and marks the thermostat entry ready to be paired with a thermostat management account. Entries in the thermostat registration pool may be referenced by their unique thermostat identifier, the public network address that they used (or, more particularly, the public address of the private network router through which they connect to the Internet), and optionally other relevant metadata associated with the thermostat.

In some embodiments, update server 604 attempts to update software, firmware and configuration updates to each of the thermostats registered in the thermostat registration pool. If metadata from entries in the registration pool exclude versioning information, update server may need to further query each thermostat for current versions installed. Update server 604 may access entries in the registration pool and then use corresponding network addresses in each entry to connect to the associated thermostat over the public network or private network, or both.

If newer software versions exist than currently used on a thermostat, update server 604 proceeds to send software updates to the thermostat over the public network. For example, update server may use file transfer protocols such as ftp (file transfer protocol), tftp (trivial file transfer protocol) or more secure transfer protocols when uploading the new software. Once uploaded, installation and update of the software on the thermostat may occur immediately through an auto-update option on the thermostat or manually through the interface of the thermostat as requested by a user.

One embodiment of pairing server 606 facilitates the association or "pairing" of a thermostat with a thermostat management account on thermostat management account server 612. The term "thermostat management account" can be used interchangeably with "user account" herein unless specified otherwise. Once the thermostat is paired with a user account, a rich variety of network-enabled capabilities are enabled as described further herein and in one or more of the commonly assigned incorporated applications, supra. For example, once pairing has been achieved, a person with access to the thermostat management account may access the thermostat (through the thermostat management system 506 using the thermostat access client 516) for a variety of purposes such as seeing the current temperature of the home, changing the current setpoint, changing the mode of the thermostat between "home" and "away", and so forth. Moreover, the thermostat management system 506 can then start tracking the various information provided by the thermostat which, in turn, enables a rich variety of cloud-based data aggregation and analysis that can be used to provide relevant reports, summaries, updates, and recommendations to the user either through the thermostat display itself, through the thermostat access client 516, or both. A variety of other capabilities, such as demand-response actions in which the thermostat management server sends an energy alert and/or sends energy-saving setpoint commands to the thermostats of users who have enrolled in such programs, can be carried out.

In view of the importance of establishing a pairing between the thermostat and a thermostat management account, there is provided an ability for a fallback method of pairing, which can be termed a "manually assisted" method of pairing, that can take effect and be carried out in the event that the convenient auto-pairing methods described further hereinbelow cannot be securely and reliably carried out for a particular installation. The manually assisted method may use an alphanumeric "passcode" to pair the thermostat to the thermostat management account. Typically, the passcode is sent to the thermostat over a public network, like the Internet, and displayed on the display area of the thermostat. Authorization to access the thermostat is provided if the user obtaining the passcode from the display on the thermostat then enters it into a pairing dialog presented when the user logs into their thermostat management account. Pairing server 606 pairs the thermostat with the user's thermostat management account if the user enters that same passcode that was displayed on their thermostat display.

According to a preferred "auto-pairing" method, the pairing server 606 may automatically pair or "auto-pair" a thermostat management account to a thermostat if both are located on the same private network. If the thermostat and thermostat management account are associated with the same private network, embodiments of the present invention presume the thermostat is at the user's home, office, or other area where the user should also have control of the device. To make this determination automatically, the pairing server 606 compares the public network address that was used to register the thermostat over the Internet with the public network address used by the computer device that has most recently been used to access the thermostat management account. Since the thermostat and computer device only have private network addresses, the router on the private network they share inserts the same public network address into their packets thus allowing the two devices to access servers, services, and other devices on the Internet. "Auto-pairing" takes advantage of this fact and automatically pairs devices sharing the same public network address. This is particularly advantageous from a user standpoint in that the user is not bothered with the need to enter a passcode or other alphanumerical identifier in order to achieve the pairing process, and avoids the concern that a user may inadvertently enter incorrect codes or identifiers into the system. Details on auto-pairing and manually assisted pairing are described in further detail later herein.

Thermostat front end user-interface (UI) server 608 facilitates the generation and presentation of intuitive, user-friendly graphical user-interfaces that allow users to remotely access, configure, interact with, and control one or more of their network-connected thermostats 110/112 from a computer web browser, smartphone, tablet, or other computing device. The user-friendly graphical user-interfaces can also provide useful tools and interfaces that do not necessarily require real-time connectivity with the thermostats 110/112 with examples including, for some embodiments, providing user interfaces for displaying historical energy usage, historical sensor readings and/or occupancy patterns, allowing the user to learn about and/or enroll in demand-response programs, provide social networking forums that allow users to interact with each other in informative, competitive, fun ways that promote energy savings, provide access to local information including weather, public safety information, neighborhood calendar events, and local blogs, and more generally provide services and information associated with a comprehensive "energy portal" functionality. Examples of intuitive, user-friendly graphical user-interfaces provided by the UI server 608 according to one or more preferred embodiments are described further in co-pending U.S. patent application Ser. No. 13/317,423.

In some embodiments, a thermostat access client user-interface displays an image of a house representing a primary enclosure paired to the thermostat management account in the thermostat management system. Thermostat front end UI server 608 may further instruct the thermostat access client, such as thermostat access client 516 in FIGS. 5A and 5B, to display images visually representative of one or more thermostats 110/112 inside the primary enclosure. By default, each of the one or more thermostat images may also display a current temperature measurement in the enclosure. In some embodiments, the user-interface may also further display an image of an additional house, or houses, representing a secondary enclosure having additional thermostats that are also paired to the thermostat management account. The image of the additional house may appear smaller, out of focus or generally deemphasized visually in relationship to the image of the house representing the primary enclosure. Additional enclosures beyond the secondary enclosure can also be displayed in the user interface and should also appear visually deemphasized compared with the image displayed for the primary enclosure. Further information on the thermostat access client and user-interface are described in more detail in co-pending U.S. patent application Ser. No. 13/317,423.

Thermostat backend server 610 manages the storage of data used by various thermostat management servers in the thermostat management system 506. In some embodiments, thermostat backend server 610 may manage storage of the thermostat registration pool data used by the registration server 602 or may organize and store new software updates and releases for the update server 604. In another embodiment, thermostat backend server 610 may also store heating and cooling related data (i.e., date and time HVAC system was in either heating or cooling mode within the enclosure), sensor information, battery-level data, alarms, etc. associated with an enclosure that was sent to the thermostat management system 506 by thermostats registered therewith, and in some embodiments and provide pre-computed heating and cooling schedules, applications, and other data for download over the public network for use by the thermostats.

In some embodiments, thermostat management account server 612 is used to create new accounts and update existing accounts on thermostat management system 506. To access their thermostat over a thermostat access client 516 and enjoy the benefits of thermostat connectedness, the user is first required to create of a thermostat management account ("user account") on thermostat management account server 612 using their thermostat access client 516. Accordingly, users execute the thermostat access client 516 on a computer or other computer device to access the thermostat management account server 612. The thermostat management account server 612 should receive at least the zip code and/or city and state for the enclosure in which the thermostat is (or will be) installed, such that weather information provided by a weather service can be accessed and downloaded to the thermostat, which can be used as part of its optimal enclosure characterization and HVAC control algorithms. Optionally, a variety of other information including a user's contact information, enclosure street addresses, and so forth can also be received. Primary options associated with the thermostat management account server 612 include pairing one or more thermostats to the correct thermostat management account through pairing operations provided by pairing server 606. However, even if the account is not yet paired with a thermostat, the user may use the thermostat management account to access local information including weather, public safety information, neighborhood calendar events, local blogs and more information based upon the user's contact information, locale and other interests.

Figure 7:
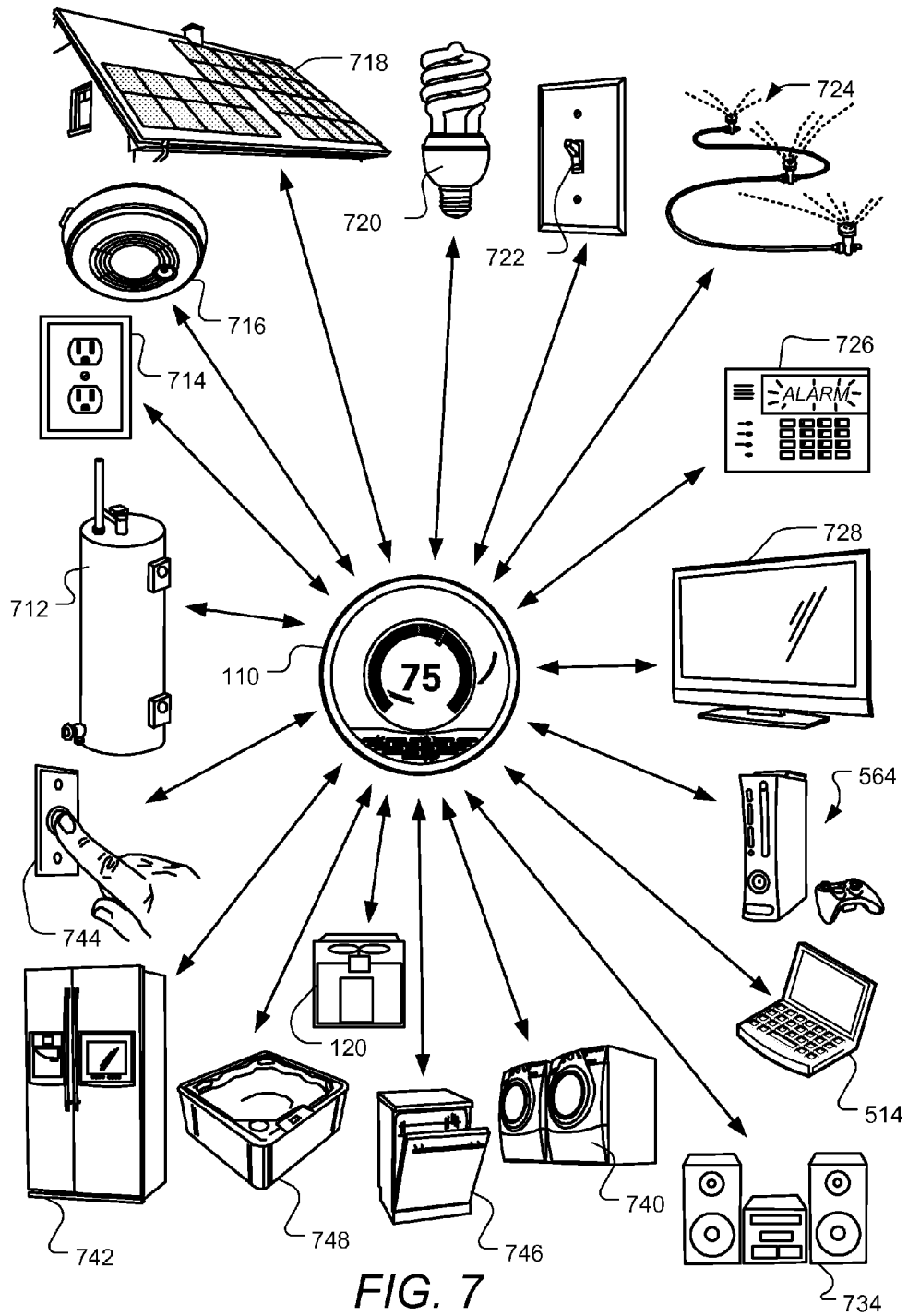
FIG. 7 is a diagram illustrating a network-connected user-friendly learning thermostat serving as a hub for managing, controlling or use, or facilitating the managing, controlling or use of various systems and devices in an energy efficient manner, according to some embodiments.

FIG. 7 is a diagram illustrating a network-connected user-friendly learning thermostat serving as a hub for managing, controlling or use, or facilitating the managing, controlling or use of various systems and devices in an energy efficient manner, according to some embodiments. Thermostat 110 is shown serving as an HVAC-centric home energy hub based on an energy efficiency platform. According to some embodiments, thermostat 110 is connected or linked to (such as via a home network 502 shown in FIGS. 5A and 5B) one or more household devices or systems, so as to allow management, control or use, or facilitating the managing, controlling or use thereof. Examples of household devices or systems include but are not limited to: HVAC system 120, water heater 712, electrical outlet(s) 714, smoke and or carbon monoxide detector(s) 716, solar panel array 718, light(s) 720, switch(es) 722, sprinkler or irrigation system(s) 724, home alarm system 726, television(s) or display(s) 728, video game console(s) 564, computer 514, stereo, sound system or audio system 734, washer and dryer 740, refrigerator 742, doorbell 744 and dishwasher 746.

According to some embodiments, one or more of the household systems or devices connected or linked to thermostat 110 are compatible under license or other business arrangement with the thermostat unit manufacturer and/or thermostat data service provider. According to some embodiments, the thermostat 110 functional as central "energy hub" for the whole house. Especially for a residential context, it has been found that thermostat 110 is an advantageous way to instantiate such a "home energy network," at least because virtually all homes need to have a thermostat anyway. Once the thermostat 110 is installed (by replacement of an old thermostat, as part of new construction, etc.) and connected or paired (such as via local network 502, public network 504 and/or thermostat management system 506 shown in FIGS. 5A, 5B and 6), it can effectively serve as the core for such a network. In this sense, a relatively seamless transition for most residences to the concept of a home energy network is provided, in that there is no extra hardware needed to be installed, plugged in, updated, and maintained, and likewise no need to have an always-on home computer loaded with an additional software (that in turn needs to be updated and maintained). Instead, the thermostat-centric home energy network is simply achieved by upgrading a home's old thermostat to the visually pleasing, easy-to-use thermostat 110. The various features and user interfaces of the thermostat-centric home energy network can be provided directly to the user's existing smartphones/tablets/browsers by virtue of the cloud-based thermostat management system 506. At the user's own pace of implementation, which can correspond to natural product upgrade or replacement cycles, new devices such as those shown in FIG. 7 can be purchased and/or modified to contain a Wi-Fi and/or ZigBee communication capability and configured to communicate with the thermostat 110, which can then upload the various data to the cloud server, and can further receive and distribute control instructions from the cloud server to the various end devices. This can lead to one or more of the following exemplary advantageous uses. For example, using wireless communications the thermostat unit 110 can communicate with the dishwasher 746, or the refrigerator 742. If the user walks up to the dishwasher 746 and attempts to start it, there can be a display on the dishwasher that says "Would you like to start the load now for $1, or wait until 2 AM and do the load for 20 cents?" The thermostat 110 serves and the conduit and core for such a platform. In one example of many advantages, with occupancy sensing the thermostat 110 can sense when the occupants are not home, and automatically command the refrigerator to turn up its set point by 2 degrees, and then command it to return to normal after the thermostat 110 has sensed that the occupants have returned. Similar functionalities can be provided in conjunction with any hot water heaters 712, hot tubs or pool heaters 748, and so forth that are equipped and licensed to be compatible with the thermostat 110. In another example occupancy information from thermostat 110 is used to manage outlets 722 and lights 716, for both intra-day and inter-day periods of non-occupancy. For inter-day periods, for example, the lights and certain outlets are controlled so as to provide for the appearance of occupancy to inexpensively and effectively increase home security. In another example, weather, climate, temperature, humidity and/or dew point, solar output, precipitation, and/or wind information that may be gathered already as part of the operation of thermostat 110 (for example from thermostat management system 506) is used for improving energy and/or resource efficiency of sprinkler system 724, hot-tub, spa or pools heating system 748 and solar power array 718. In a simple example, timing and watering days are adjusted due to forecast or detected rain and/or high temperatures. In another example, hot-tub, spa or pool heating system 748 is also controlled according to occupancy information from thermostat 110, such as by reducing heating during long periods of non-occupancy and/or increasing heating during expected or detected occupancy or occupant arrivals. In another example, occupancy sensor information from thermostat 110 is used to supplement and increase the accuracy and reliability of home alarm system 126. In another example, occupancy information from thermostat 110 is used to facilitate computer-related tasks on computer 514 that maybe more efficient or less intrusive to carry out when the home is unoccupied, such as large data backups, software updates, and maintenance such as disk defragmentation. In another example, occupancy and/or installation information from thermostat 110 (such as weather the building is a home or business) can be used to adjust sensitivity to smoke detectors and/or carbon monoxide detectors 716 so as to increase effectiveness while decreasing false alarms. In another example, water heater 712 is adjusted to save energy during long periods of non-occupancy as determined by thermostat 110. According to some embodiments, the thermostat 110 is works in connection with other home automation control systems such as INSTEON plug-in controllers for dimmers, lights, outlets, sprinklers, etc. For some cases, the thermostat 110 can achieve this control by virtue of programs and data that are stored at the thermostat 110 itself, optionally as updated by the cloud server as needed, while for other cases the thermostat 110 will be more of a communications conduit for data uptake to the cloud server and transmission of decisions made at the cloud server to the various network devices.

According to some embodiments, thermostat 110 is used in connection with video game console 564 and/or computer 514 to encourage adoption of energy-efficient behavior through the use of competition, game-related incentive or rewards, and/or exchange of thermostat-related settings or algorithms with other users.

Figure 8:
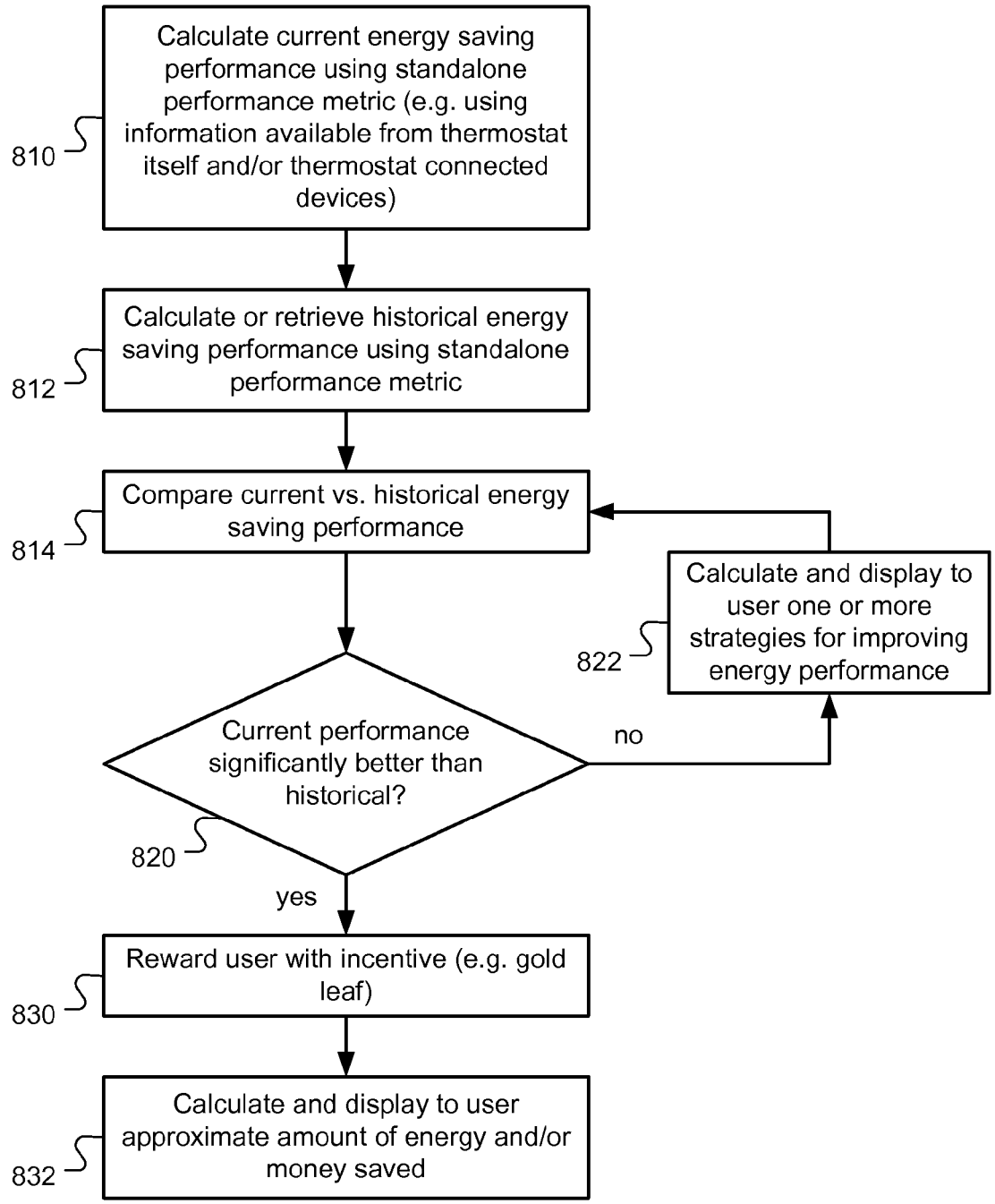
FIG. 8 is a flow chart illustrating aspects of encouraging adoption of energy efficient behavior using performance metrics through self-competition, according to some embodiments.
Figure 9:
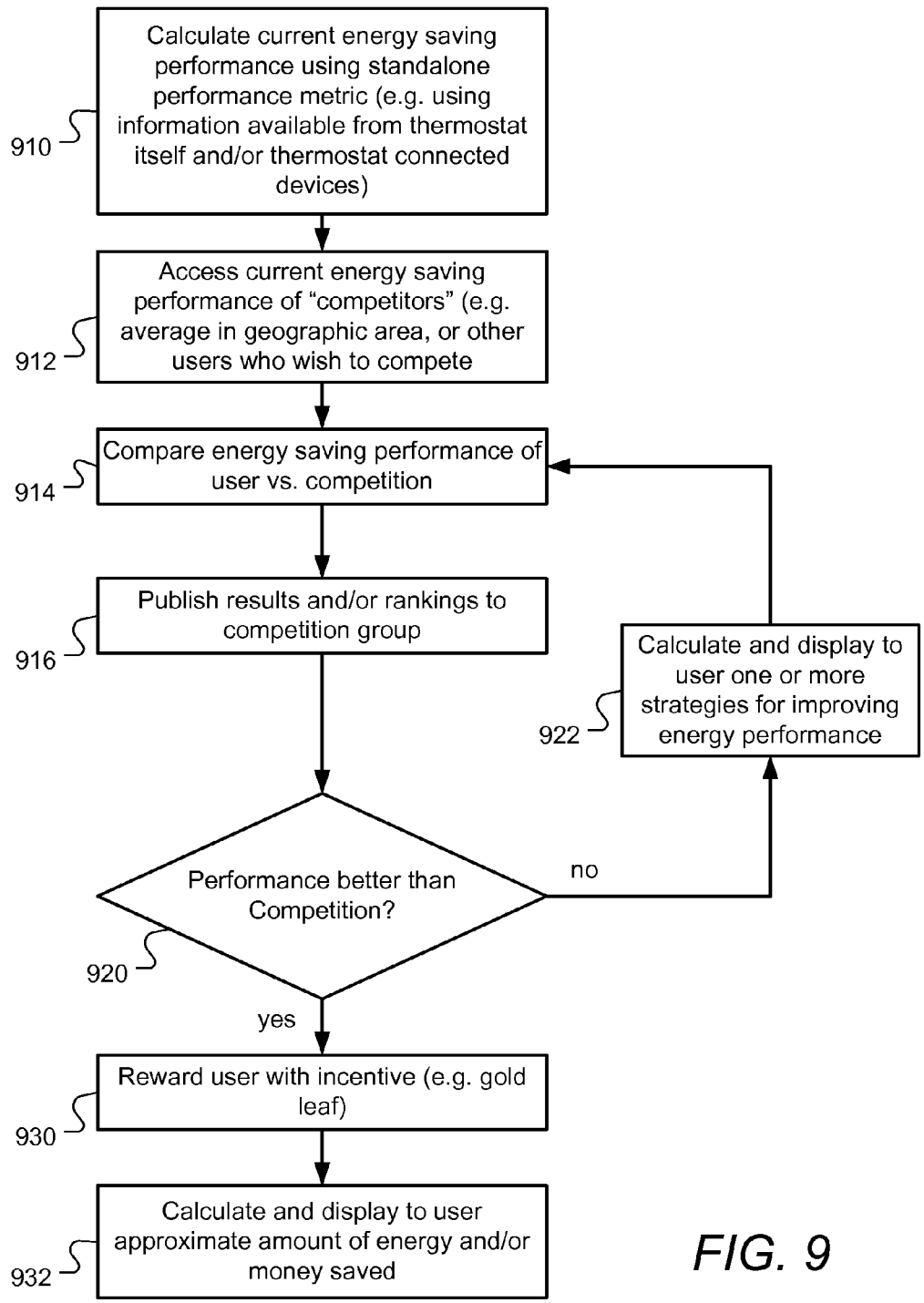
FIG. 9 is a flow chart illustrating aspects of encouraging adoption of energy efficient behavior using performance metrics through competition with others, according to some embodiments.

FIGS. 8-9 illustrate examples of encouraging adoption of energy efficient behavior using performance metrics that are based on data that is sensed or governed only by the thermostats themselves in their course of operation, termed herein stand-alone performance metrics (SPM). Competition based on SPM data is particularly advantageous in that it does not require cooperation from external data providers, such as electric utility smart-meter information that might be outside the ecosystem of the thermostat 110, and therefore is more readily implemented by a provider of the thermostat 110 and the cloud server support structure.

FIG. 8 is a flow chart illustrating aspects of encouraging adoption of energy efficient behavior using performance metrics through self-competition, that is, where a user is competing against their own historical record, according to some embodiments. In step 810, according to some embodiments, the user's energy-saving performance is measured only by virtue of physical parameters that can be sensed or governed by the thermostat itself, in combination only with physical parameters that can be sensed or governed by the thermostats of their neighbors or other competition. By using such a stand-alone performance metric (SPM), the competition can be carried out by a provider of the thermostat and its associated cloud-based support system, without requiring cooperation from other vendors such as smart-meter providers. In step 812, historical or baseline performance is either calculated or retrieved (e.g. from a database with thermostat management system 506 in FIGS. 5A and 5B). In step 814 the current performance is compared with the historical performance. In decision step 820, if the current performance is not significantly greater (e.g. greater by more than a predetermined threshold percentage, such as 1-5%) than the historical performance, control passes back up to comparison step 814. Optionally, in step 822, one or more strategies for helping or encouraging the use to improve performance is calculated and displayed to the user either via the access client and/on device or on the thermostat 110 display. If the performance is significantly improved, then in step 830 the user is rewarded with an incentive, such as s gold leaf displayed on the thermostat 110 or on the access client. According to some embodiments, other rewards or incentives, such as financial or video game rewards, are awarded. According to some embodiments, the length of time during which the improved behavior is adapted and/or the amount of performance increase is used to determine the amount of awards or rewards. For example, according to some embodiments the gold leaf award is only given if the user has maintained the energy efficient settings for more than one month. In step 832, the amount of energy and/or money saved is calculated and/or displayed to the user.

According to some embodiments, an SPM is based only on the percentage of time that their HVAC system is cycled on ("on-time percentage" or "OTP"), wherein the performance metric is higher (better) when the on-time percentage is lower. For other embodiments, the user's energy-saving performance is measured only by virtue of physical parameters that can be sensed or governed by the thermostats themselves in combination with weather information that can be readily accessed based on the user's geographical information, such as ZIP code. For these embodiments, the standalone performance metric preferably is modified to take into account the outside weather, such as the outside temperature.

In one example, for a heating scenario, the SPM "M" can have the formula:

$$M = \frac{1}{1.0 * OTP[T > 50° \ F.] + 0.6 * OTP[30° \ F. < T \le 50° \ F] + 0.3 * OTP[T \le 30° \ F.]}$$

where OTP[T>50° F.] is the on-time percentage when the outside temperature is greater than 50 F, and OTP[30° F.<T≤50° F.] is the on-time percentage when the outside temperature is between 30 F-50 F, and so forth.

According to some other embodiments, the performance metrics can be more complex, including both HVAC performance and other energy performance metrics, such as can be acquired from homes with smart meters connected to the cloud.

FIG. 9 is a flow chart illustrating aspects of encouraging adoption of energy efficient behavior using performance metrics through competition with others, according to some embodiments. In step 910, according to some embodiments, the user's energy-saving performance is measured using an SPM. In step 912, current energy performance is either calculated or retrieved (e.g. from a database with thermostat management system 506 in FIGS. 5A and 5B) for the user's competitors. According to one embodiment, the competitors are other users of similar network connected thermostats in the same local area (e.g. as could be determined by Zip code). According to some other embodiments, the competition group could be a custom group that is selected via the use of a third-party social networking site 580 in FIG. 5B. For example, a competition group could be formed using Facebook or a similar service by asking friends or other users to "join" the competition group. In step 914 the user's performance is compared against the performance of the competition group. According to some embodiments, the comparison in step 914 could be performed in several ways, for example on ranking could be calculated in terms of current energy efficiency or some absolute or relative efficiency metric, while another ranking could be calculated in terms of most improved when compared with their own historical performance values. In other examples, the comparison in step 914 could also include rankings with certain sub groups defined by metrics such as home size, type (apartment vs. single family home, geographic region, etc.) In step 916, the results of the comparison or ranking in step 914 may be published or distributed to the members of the defined competition group(s). In decision step 920, if the user's performance is no better than the competition, control passes back up to comparison step 914. The metric for "better" in decision 920 can be made in several ways, especially when the competition group is large. For example, the threshold for an award or reward could be given for the top 20% of the group in terms of absolute efficiency and most improved. According to other examples, the awards could be given by high or top placings in one or more defined sub-groups. Optionally, in step 922, one or more strategies for helping or encouraging the use to improve performance is calculated and displayed to the user either via the access client and/on device or on the thermostat 110 display. If the performance is worthy of an award, reward or other recognition, then in step 930 the user is rewarded or recognized, which can include distributing the news of the winner(s), runners, up, etc. to the other members of the competition group. According to some embodiments, other rewards or incentives, such as financial or video game rewards are awarded. In step 932, the amount of energy and/or money saved is calculated and/or displayed to the user or to other members of the competition group.

Figure 10:
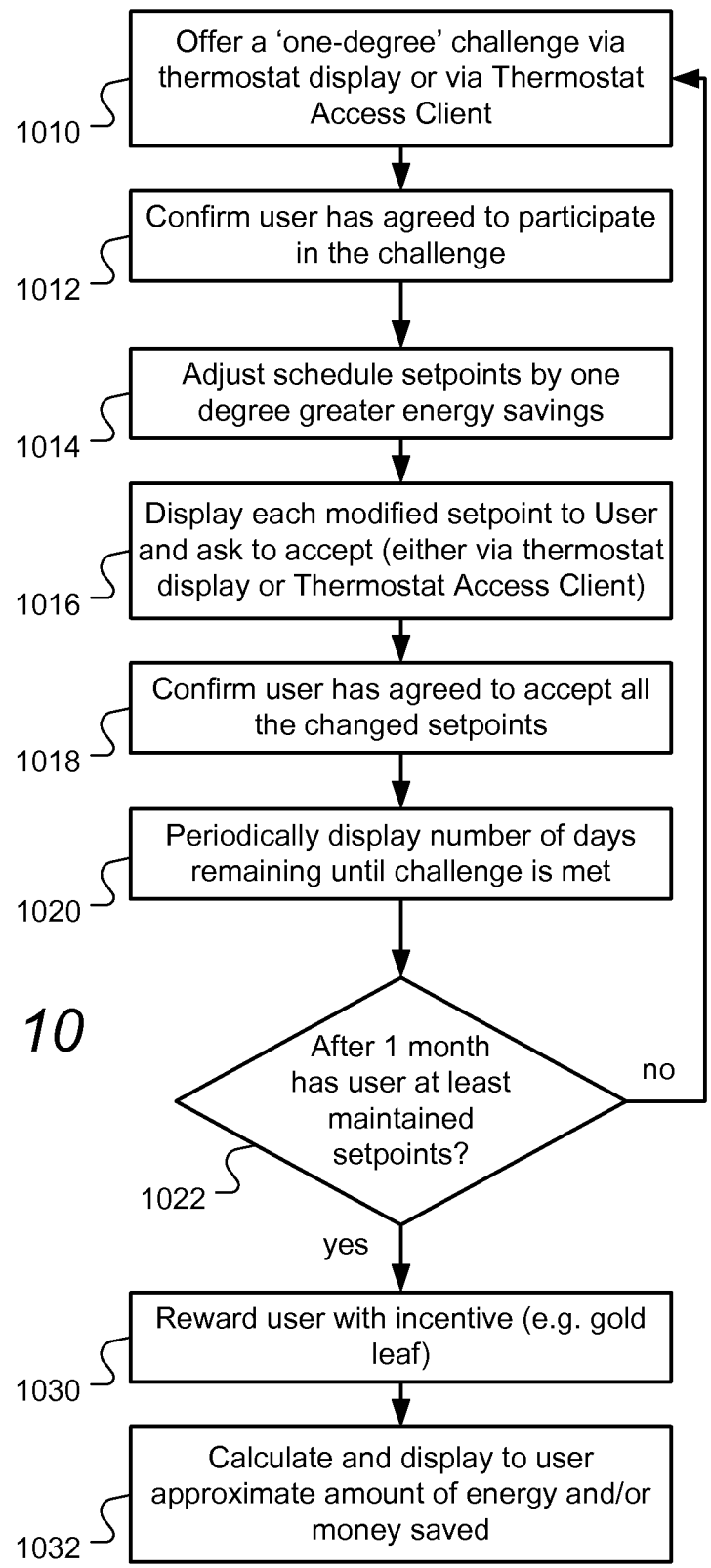
FIG. 10 is a flow chart illustrating aspects of encouraging adoption of energy efficient behavior using challenge, according to some embodiments.

FIG. 10 is a flow chart illustrating aspects of encouraging adoption of energy efficient behavior using challenge, according to some embodiments. In this example, the user is simply given "the one degree challenge", whereby the thermostat display challenges the user to simply to change their settings to a less energy-intensive setting by one degree Fahrenheit, and if they accept the challenge and do not alter these more efficient settings for some period of time, they are reward with a "Gold Leaf" award on their display. In step 1010 the user is offered the one-degree challenge via the display of the thermostat or the access client. According to some embodiments, the user is offered the challenge in connection with an estimates cost of energy savings, such as for example "we believe you can go from $160/mo. to $130/mo. if you accept this challenge." In step 1012, a confirmation is made the user has accepted to take the challenge. In step 1014 the user's schedule setpoints are adjusted one degree towards greater energy savings. In step 1016, each modified setpoint is displayed to the user and the user is asked to confirm the modifications. If the thermostat display is used, then the setpoints are displayed one-by-one. If the access client is used in which there is a large display area (such as on a tablet or on a computer monitor) then several setpoint changes can be displayed at once. In step 1018 a confirmation is made that the user has accepted all the modified setpoints. In step 1020, the number of days remaining required for the user to achieve success is periodically displayed on the thermostat display, and also is shown in the user interface of the access client. If the user attempts to manually modify any of the setpoints which would take them out of the challenge parameters, a warning message is displayed that to make he change will result in a failure of the challenge. In some examples, the number of days remaining in the challenge is also displayed. In step 1022, after one month, or some other predefined time period, if the user has maintained the setpoints (or made changes towards even greater energy savings), then in step 1030 the user is rewarded with an award (such as gold leaf icon). According to some embodiments one or more other incentive rewards are given, such as recognition on a selected social network site, video game benefits, or reward miles on a user-selected frequent shopper or flyer program. In step 1032, the amount of energy and/or money saved is calculated and/or displayed to the user. In other embodiments, different challenges can be given to the user. For example, as an optional alternative to step 1010, the user can be challenged simply to "yield thermostat control to my energy-saving algorithms for one week". If the user responds "yes", then the thermostat 110 will operate according to one or more predetermined algorithms that judiciously governs the temperature set point and/or other schedule settings (which can be based on actual historical settings by the user) in a manner that reduces energy usage. If the user can make it through one week (or other predetermined period of time) without manually overriding the algorithm's settings, which could potentially be aggressive at some time intervals, then the user is rewarded with a "gold leaf" display or other message of congratulations, and/or given any of the other incentive rewards described herein.

Figure 11:
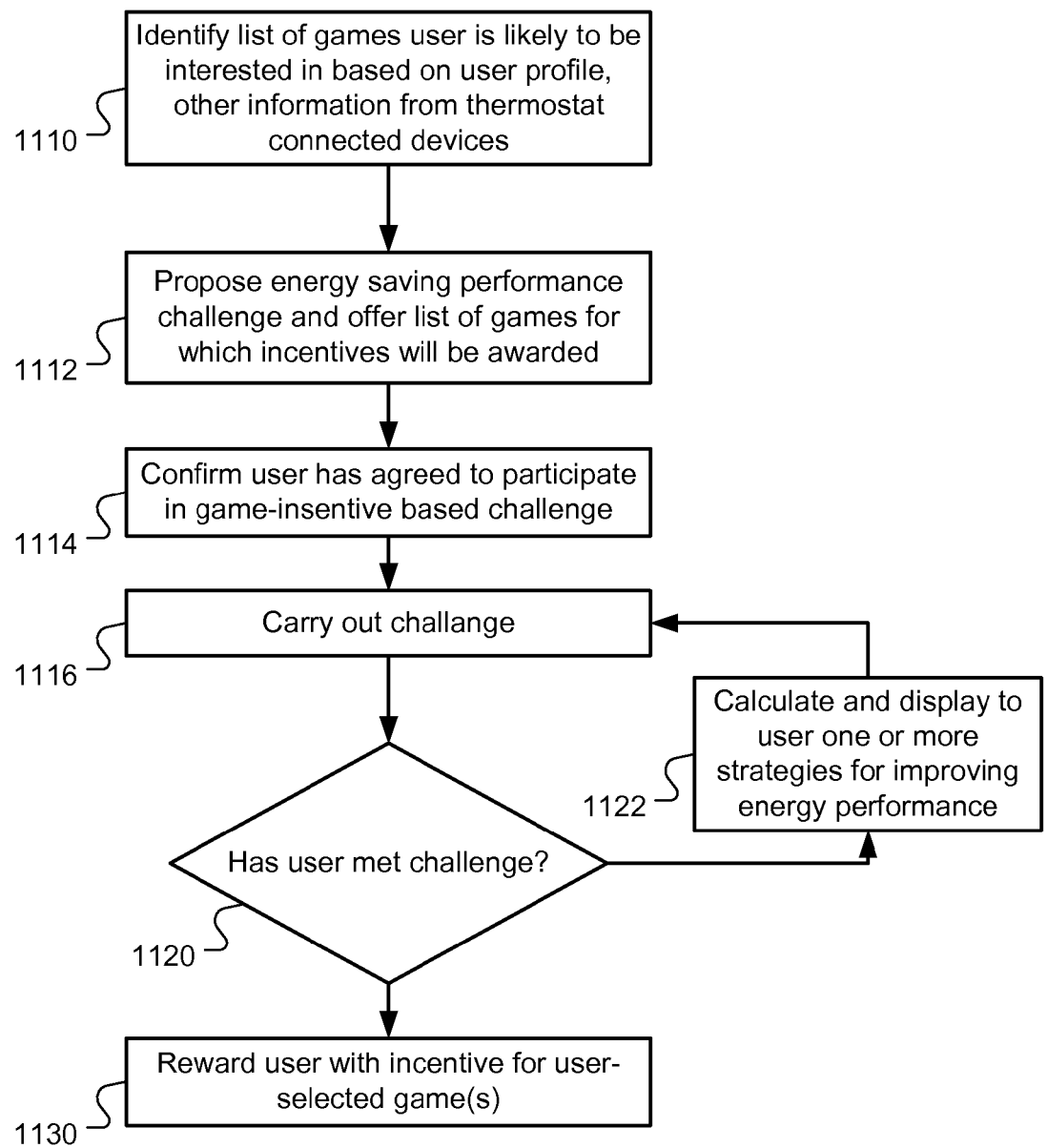
FIG. 11 is a flow chart illustrating aspects of encouraging adoption of energy efficient behavior through video game-related awards or incentives, according to some embodiments.

FIG. 11 is a flow chart illustrating aspects of encouraging adoption of energy efficient behavior through video game-related awards or incentives, according to some embodiments. In these embodiments, promotional business arrangements are made with online video game companies such as World of Warcraft, Second Life, Sims, Farmville, etc., and accumulation of energy-saving performance points can be used for in-game benefits such as in-game ammunition, in-game money, in-game status or social benefits, and so forth. The in-game benefits can be "generic" in one embodiment, meaning that they are not specific to the thermostat-centric energy-saving platform, while in other embodiments the in-game benefits can be specially tailored for the thermostat-centric energy-saving platform, meaning that the only way to acquire those in-game benefits is through accumulating energy-saving performance points. In general the types of video games and the types of reward incentives are as described with respect to FIG. 5B supra. In step 1110, a list of video games is identified in which the user is likely to be interested in based on the user profile stored in the cloud-based thermostat management system 506 and/or other information from the thermostat connected devices such as described in FIG. 7 supra. For example, connection, link or information sharing with video game console 564, could be used to generate a list of game for which the user has been playing recently. In step 1112, the an energy saving challenge is proposed to the user along with a list of incentives for various games identified in step 1110. Examples of the challenge include competition or challenges shown in FIGS. 8, 9 and 10 supra. In step 1114, a confirmation is made that the user has accepted the challenge. In step 1116 the challenge or competition is carried out (e.g. as described in FIGS. 8, 9 and 10 supra). In decision step 1120, a determination is made whether or not the user has met the challenge (or performed well enough in the competition) such that a reward is justified. If the user has not reached that level, in step 1122 a calculation is made and displayed of one or more strategies for improving energy performance (e.g. "consider lowering your night-time set point from 70 degree to 68 degrees, which we estimate would qualify you to have met the challenge and would save you about $18 per month!"). In step 1130 the user is rewarded with a game-related incentive reward. According to some embodiments, the user is asked to select an award from a list of game-related incentives. According to some embodiments the level or amount of reward is linked to the energy-savings achieved. For example, in the case of a group competition such as described in FIG. 9, different award amounts are given for first, second and third places for a given category of competition.

Figure 12:
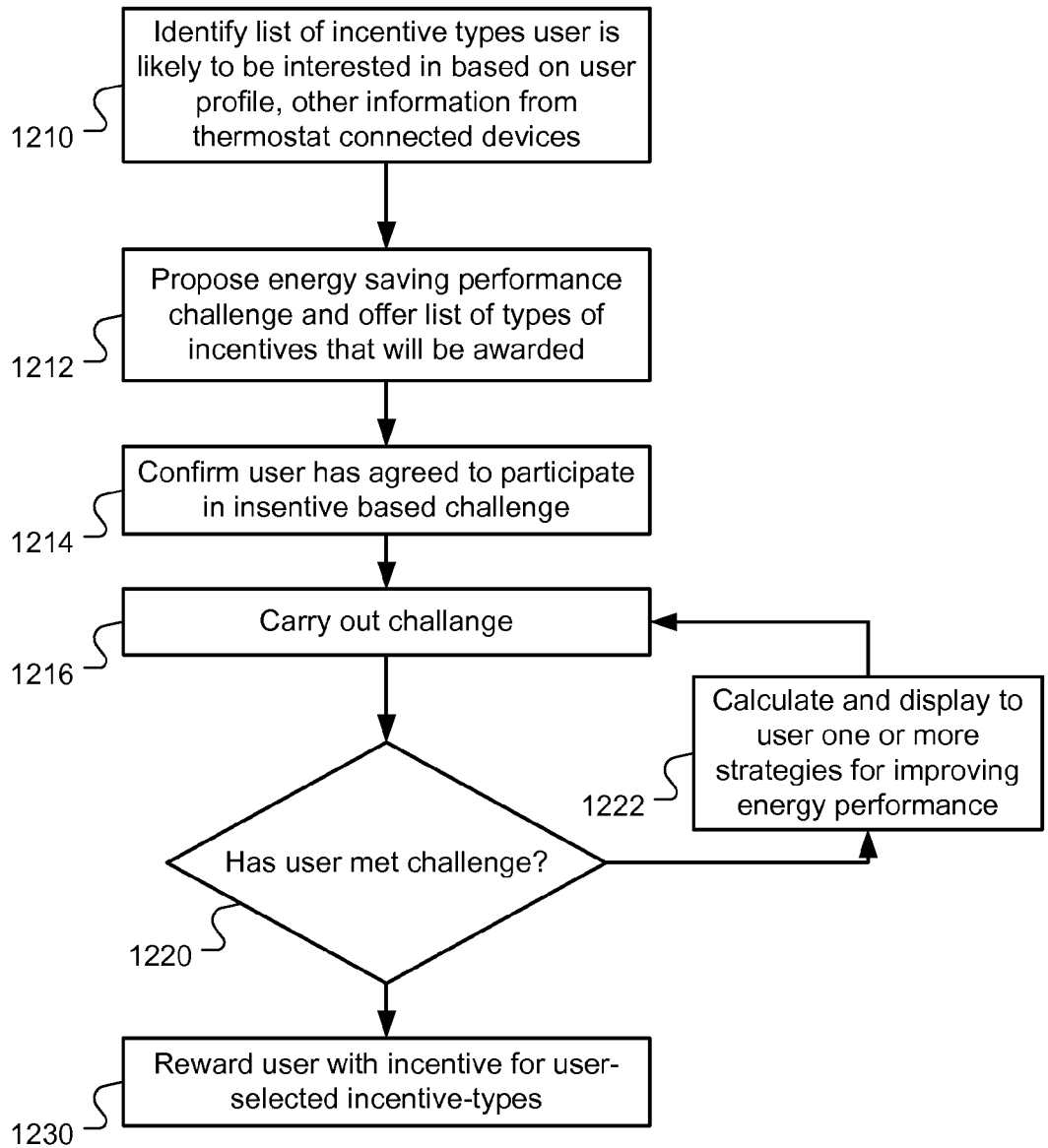
FIG. 12 is a flow chart illustrating aspects of encouraging adoption of energy efficient behavior through other types of awards or incentives, according to some embodiments.

FIG. 12 is a flow chart illustrating aspects of encouraging adoption of energy efficient behavior through other types of awards or incentives, according to some embodiments. In this example, by virtue of promotional business arrangements with credit card companies, airlines, or retailers, accumulation of energy-saving performance points can be used for cash incentive rebates, favorable credit card interest rate treatment, airline miles, or other like program benefits. In step 1210, a list of incentive types is identified in which the user is likely to be interested in based on the user profile stored in the cloud-based thermostat management system 506 and/or other information from the thermostat connected devices such as described in FIG. 7 supra. In step 1212, an energy saving challenge is proposed to the user along with a list of incentives identified in step 1210. Examples of the challenge include competition or challenges shown in FIGS. 8, 9 and 10 supra. In step 1214, a confirmation is made that the user has accepted the challenge. In step 1216 the challenge or competition is carried out (e.g. as described in FIGS. 8, 9 and 10 supra). In decision step 1220, a determination is made whether or not the user has met the challenge (or performed well enough in the competition) such that a reward is justified. If the user has not reached that level, in step 1222 calculation is made and displayed of one or more strategies for improving energy performance. In step 1230 the user is rewarded with the incentive. According to some embodiments, the user is asked to select an award from a list of incentives. According to some embodiments the level or amount of reward is linked to the energy-savings achieved. For example, in the case of a group competition such as described in FIG. 9, different award amount are given for first, second and third places for a given category of competition.

Figure 13:
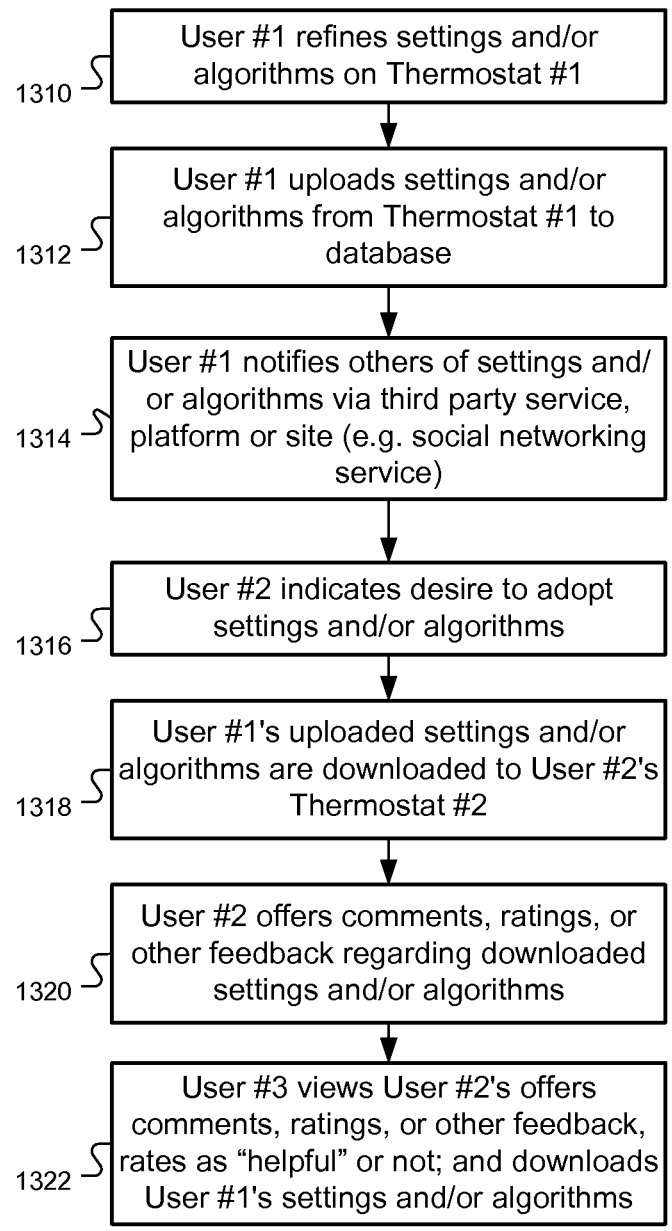
FIG. 13 is a flow chart illustrating aspects of encouraging adoption of energy efficient behavior through the sharing or thermostat settings and/or algorithms, according to some embodiments.

FIG. 13 is a flow chart illustrating aspects of encouraging adoption of energy efficient behavior through the sharing or thermostat settings and/or algorithms, according to some embodiments. In these examples, the sharing of thermostat settings and/or algorithms is facilitated using the thermostat access client 516, thermostat management system 506 and/or third party services such as services 580 or 590 shown in FIG. 5B, supra. Such sharing advantageously allows the user be able to click and download settings, such a particular the schedule. The selected setting is automatically loaded on the user's thermostat and the user does not need to be manually entered by the user. The types of settings shared in these examples can include simple setting such as a setpoint schedule found to be particularly useful to some users, to more advanced and/or obscure settings such as adjustments to sensor sensitivity. Examples of algorithms that might be shared include algorithms related to thermostat learning, auto-away/auto-arrival, and thermodynamic modeling of the thermostat's building or enclosure. In some examples the shared settings and/or algorithms are user-generated and in other examples the manufacturer of the thermostat generates them.

The sharing of settings and algorithms may be particularly useful among members of a specific demographic. For example, swing/non-standard shift workers may benefit from adopting a program setpoint schedule that more accurately reflects their occupancy and sleep patterns. In another example, swing/non-standard shift workers may benefit from occupancy algorithms that are more sensitive to occupancy detection during the nighttime. An example of such an algorithm may include decreasing the number of consecutive buckets of PIR sensor activity needed to activate an auto-away and/or auto arrival. For further details of thermostat sensing systems, see co-pending International Patent Application No. PCT/US11/61479, supra. For further details of auto-away and auto-arrival algorithms, see co-pending International Patent Application No. PCT/US11/61437, supra. Another example of types of algorithms that might be shared among thermostat owners relates to detection of the activity of household pets. In some cases, for example in mild climates it may be useful for the auto-away and auto-arrival algorithms to ignore the detection of pets, while in more extreme climates it may be useful not to ignore pets. Certain settings and/or algorithms may further be suited to households with large or small pets, for example settings relating to the PIR sensor angle of sensitivity may be set differently to ignore or detect occupancy and/or activity of certain sizes of pets. In another example, a first user may post a particular algorithm or setting for review by others. Other thermostat users may review the efficacy of algorithm or setting or even suggest changes. Yet other thermostat users may decide to adopt the posted algorithm or setting depending on such reviews.

In step 1310, a first user refines settings and/or algorithms in his or her thermostat. In step 1312, the first user uploads the settings and/or algorithms to a database, such as database 522 shown in FIGS. 5A and 5B. In step 1314 the first user notifies others of the settings and/or algorithms. In some examples, this notification is via a third party service such as social networking service 580 shown in FIG. 5B. In other examples, the notification is through a the thermostat access client 516 and thermostat management services 506, and potentially in the form of a forum or bulletin board accessible by registered users of network-connected thermostats. In step 1316 a second user sees the first user's notification and decides to adopt the first user's uploaded settings or algorithms. In step 1318 the second user downloads the settings and/or algorithms to his or her thermostat. In step 1320 the second user, after using the downloaded settings and/or algorithms for some time, offers comments, ratings or other feedback. In some examples, the feedback is posted publicly for other to see. In step 1322, a third user views second user's feedback and based on it decides to download the settings and/or algorithms. In some examples, the first user may modify the settings and/or algorithms in response to the second user's feedback, thereby improving the settings and/or algorithms. In some examples, users are asked to rate the shared material on a ratings scale of one to five stars, and other users may indicate whether or not they found another's review to be helpful.

Various modifications may be made without departing from the spirit and scope of the invention. Indeed, various user interfaces for operating thermostats, HVACSs and other devices have been provided yet the designs are meant to be illustrative and not limiting as to the scope of the overall invention. While methods and systems have been described for pairing thermostats using autopairing and passcode pairing, it is contemplated that these methods and system may be applied to any device on a private network attempting to pair with an account. For example, embodiments of the present invention are not limited to network attached thermostats but any device connected to a network such as set-top boxes, streaming server devices, streaming service applications, computers, mobile phones, voice-over-IP phones, or anything that might benefit from an autopairing function in accordance with embodiments of the present invention. It is to be further appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described embodiments, but instead is defined by the appended claims in light of their full scope of equivalents.

What is claimed is:

1. A method for encouraging a user to adopt energy-efficient settings on a network-connected thermostat installed in an enclosure, the method comprising:
    at a first thermostat installed in a first enclosure, the first thermostat having at least one temperature sensor, receiving from a first user a first HVAC schedule for use on said first thermostat, said first thermostat being operated according to said first HVAC schedule,
    determining at least one energy efficiency performance metric based on said operation of said first thermostat and based on associated temperature trajectories of said first enclosure;
    receiving, at a first network-connected device associated with said first thermostat, a request to share said first HVAC schedule and said at least one energy efficiency performance metric;
    at a cloud server, receiving said first HVAC schedule and said at least one energy efficiency performance metric;
    receiving, at said cloud server, a request from a second user to obtain one or more informational items for reducing energy usage in a second thermostat installed in a second enclosure;
    determining that said second enclosure is in a common geographical area as said first enclosure;
    downloading said first HVAC schedule to said second thermostat installed in said second enclosure; and
    operating said second thermostat according to said first HVAC schedule.

2. The method according to claim 1 wherein the first HVAC schedule defines an algorithm used by a network-connected thermostat.

3. The method according to claim 1 wherein the first HVAC schedule includes setpoint settings for use by a network-connected thermostat.

4. The method according to claim 1 wherein the first user notifies second user of the first HVAC schedule, and the notification is facilitated by third party social networking service.

5. The method according to claim 1 wherein the second user offers feedback associated with the first HVAC schedule.

6. The method according to claim 5 wherein a third thermostat user views the feedback and based at least partly thereon requests the first HVAC schedule.

7. The method according to claim 1, wherein the first thermostat includes an occupancy sensor that is configured to detect an occupancy of the first enclosure, said HVAC schedule being based in part on an occupancy pattern of the first user, and wherein the method further comprises receiving information associated with the occupancy of the first enclosure at the cloud server and determining that the second user has an occupancy pattern that is similar to the first user.

* * * * *